(12) United States Patent
Gousev et al.

(10) Patent No.: US 8,077,379 B2
(45) Date of Patent: Dec. 13, 2011

(54) INTERFEROMETRIC OPTICAL DISPLAY SYSTEM WITH BROADBAND CHARACTERISTICS

(75) Inventors: Evgeni Gousev, Saratoga, CA (US); Gang Xu, Cupertino, CA (US); Marek Mienko, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/634,576

(22) Filed: Dec. 9, 2009

(65) Prior Publication Data

US 2010/0128339 A1 May 27, 2010

Related U.S. Application Data

(62) Division of application No. 11/401,023, filed on Apr. 10, 2006, now Pat. No. 7,643,203.

(51) Int. Cl.
*G02B 26/00* (2006.01)
*G02B 26/08* (2006.01)
*G02F 1/29* (2006.01)

(52) U.S. Cl. ........................................ 359/291; 359/298

(58) Field of Classification Search .......... 359/290–292, 359/295, 296, 298
See application file for complete search history.

(56) References Cited

U.S. PATENT DOCUMENTS

| | | |
|---|---|---|
| 3,656,836 A | 4/1972 | de Cremoux et al. |
| 4,377,324 A | 3/1983 | Durand et al. |
| 4,403,248 A | 9/1983 | te Velde |
| 4,459,182 A | 7/1984 | te Velde |
| 4,482,213 A | 11/1984 | Piliavin et al. |
| 4,863,245 A | 9/1989 | Roxlo |
| 4,925,259 A | 5/1990 | Emmett |
| 4,965,562 A | 10/1990 | Verhulst |
| 5,061,049 A | 10/1991 | Hornbeck |
| 5,078,479 A | 1/1992 | Vuilleumier |

(Continued)

FOREIGN PATENT DOCUMENTS

CH 680534 9/1992

(Continued)

OTHER PUBLICATIONS

Aratani et al., Process and Design Considerations for Surface Micromachined Beams for a Tuneable Interferometer Array in Silicon, Proc. IEEE Microelectromechanical Workshop, Fort Lauderdale, FL, pp. 230-235 (Feb. 1993).

(Continued)

*Primary Examiner* — David N Spector
*Assistant Examiner* — Brandi Thomas
(74) *Attorney, Agent, or Firm* — Knobbe Martens Olson & Bear LLP

(57) ABSTRACT

Broad band white color can be achieved in MEMS display devices by incorporating a material having an extinction coefficient (k) below a threshold value for wavelength of light within an operative optical range of the interferometric modulator. One embodiment provides a method of making the MEMS display device comprising depositing said material over at least a portion of a transparent substrate, depositing a dielectric layer over the layer of material, forming a sacrificial layer over the dielectric, depositing an electrically conductive layer on the sacrificial layer, and forming a cavity by removing at least a portion of the sacrificial layer. The suitable material may comprise germanium, germanium alloy of various compositions, doped germanium or doped germanium-containing alloys, and may be deposited over the transparent substrate, incorporated within the transparent substrate or the dielectric layer.

27 Claims, 17 Drawing Sheets

U.S. PATENT DOCUMENTS

| | | | |
|---|---|---|---|
| 5,099,353 | A | 3/1992 | Hornbeck |
| 5,142,405 | A | 8/1992 | Hornbeck |
| 5,226,099 | A | 7/1993 | Mignardi et al. |
| 5,293,272 | A | 3/1994 | Jannson et al. |
| 5,312,512 | A | 5/1994 | Allman et al. |
| 5,381,232 | A | 1/1995 | van Wijk |
| 5,474,865 | A | 12/1995 | Vasudev |
| 5,488,505 | A | 1/1996 | Engle |
| 5,526,688 | A | 6/1996 | Boysel et al. |
| 5,578,976 | A | 11/1996 | Yao |
| 5,597,736 | A | 1/1997 | Sampsell |
| 5,602,671 | A | 2/1997 | Hornbeck |
| 5,665,997 | A | 9/1997 | Weaver et al. |
| 5,674,757 | A | 10/1997 | Kim |
| 5,737,050 | A | 4/1998 | Takahara et al. |
| 5,771,321 | A | 6/1998 | Stern |
| 5,784,189 | A | 7/1998 | Bozler et al. |
| 5,818,095 | A | 10/1998 | Sampsell |
| 5,822,170 | A | 10/1998 | Cabuz et al. |
| 5,824,608 | A | 10/1998 | Gotoh et al. |
| 5,835,256 | A | 11/1998 | Huibers |
| 5,943,155 | A | 8/1999 | Goossen |
| 5,945,980 | A | 8/1999 | Moissey et al. |
| 5,959,763 | A | 9/1999 | Bozler et al. |
| 5,967,163 | A | 10/1999 | Pan et al. |
| 5,976,902 | A | 11/1999 | Shih |
| 5,994,174 | A | 11/1999 | Carey et al. |
| 6,031,653 | A | 2/2000 | Wang |
| 6,040,937 | A | 3/2000 | Miles |
| 6,088,162 | A | 7/2000 | Someno |
| 6,097,145 | A | 8/2000 | Kastalsky et al. |
| 6,099,132 | A | 8/2000 | Kaeriyama |
| 6,137,150 | A | 10/2000 | Takeuchi et al. |
| 6,160,833 | A | 12/2000 | Floyd et al. |
| 6,171,945 | B1 | 1/2001 | Mandal et al. |
| 6,194,323 | B1 | 2/2001 | Downey et al. |
| 6,201,633 | B1 | 3/2001 | Peeters et al. |
| 6,249,039 | B1 | 6/2001 | Harvey et al. |
| 6,275,220 | B1 | 8/2001 | Nitta |
| 6,282,010 | B1 | 8/2001 | Sulzbach et al. |
| 6,288,824 | B1 | 9/2001 | Kastalsky et al. |
| 6,323,982 | B1 | 11/2001 | Hornbeck |
| 6,327,071 | B1 | 12/2001 | Kimura et al. |
| 6,333,556 | B1 | 12/2001 | Juengling et al. |
| 6,340,435 | B1 | 1/2002 | Bjorkman et al. |
| 6,376,787 | B1 | 4/2002 | Martin et al. |
| 6,391,675 | B1 | 5/2002 | Ehmke et al. |
| 6,392,781 | B1 | 5/2002 | Kim et al. |
| 6,424,094 | B1 | 7/2002 | Feldman |
| 6,449,084 | B1 | 9/2002 | Guo |
| 6,452,124 | B1 | 9/2002 | York et al. |
| 6,452,465 | B1 | 9/2002 | Brown et al. |
| 6,466,354 | B1 | 10/2002 | Gudeman |
| 6,513,911 | B1 | 2/2003 | Ozaki et al. |
| 6,549,195 | B2 | 4/2003 | Hikida et al. |
| 6,552,840 | B2 | 4/2003 | Knipe |
| 6,574,033 | B1 | 6/2003 | Chui et al. |
| 6,600,201 | B2 | 7/2003 | Hartwell et al. |
| 6,608,268 | B1 | 8/2003 | Goldsmith |
| 6,624,944 | B1 | 9/2003 | Wallace et al. |
| 6,639,724 | B2 | 10/2003 | Bower et al. |
| 6,650,455 | B2 | 11/2003 | Miles |
| 6,653,997 | B2 | 11/2003 | Van Gorkom et al. |
| 6,660,656 | B2 | 12/2003 | Cheung et al. |
| 6,674,562 | B1 | 1/2004 | Miles |
| 6,720,267 | B1 | 4/2004 | Chen et al. |
| 6,741,377 | B2 | 5/2004 | Miles |
| 6,747,785 | B2 | 6/2004 | Chen et al. |
| 6,747,800 | B1 | 6/2004 | Lin |
| 6,791,441 | B2 | 9/2004 | Pillans et al. |
| 6,794,119 | B2 | 9/2004 | Miles |
| 6,803,534 | B1 | 10/2004 | Chen et al. |
| 6,809,788 | B2 | 10/2004 | Yamada et al. |
| 6,819,469 | B1 | 11/2004 | Koba |
| 6,844,959 | B2 | 1/2005 | Huibers et al. |
| 6,855,610 | B2 | 2/2005 | Tung et al. |
| 6,858,080 | B2 | 2/2005 | Linares et al. |
| 6,859,301 | B1 | 2/2005 | Islam et al. |
| 6,906,847 | B2 | 6/2005 | Huibers et al. |
| 6,912,022 | B2 | 6/2005 | Lin et al. |
| 6,940,631 | B2 | 9/2005 | Ishikawa |
| 6,947,200 | B2 | 9/2005 | Huibers |
| 6,952,303 | B2 | 10/2005 | Lin et al. |
| 6,958,847 | B2 | 10/2005 | Lin |
| 6,980,350 | B2 | 12/2005 | Hung et al. |
| 6,995,890 | B2 | 2/2006 | Lin |
| 6,999,225 | B2 | 2/2006 | Lin |
| 6,999,236 | B2 | 2/2006 | Lin |
| 7,016,099 | B2 | 3/2006 | Ikeda et al. |
| 7,078,293 | B2 | 7/2006 | Lin et al. |
| 7,102,808 | B2 | 9/2006 | Kasai |
| 7,110,158 | B2 | 9/2006 | Miles |
| 7,113,339 | B2 * | 9/2006 | Taguchi et al. ............ 359/586 |
| 7,123,216 | B1 | 10/2006 | Miles |
| 7,161,730 | B2 | 1/2007 | Floyd |
| 7,172,915 | B2 | 2/2007 | Lin et al. |
| 7,250,315 | B2 | 7/2007 | Miles |
| 7,291,921 | B2 | 11/2007 | Lin |
| 7,297,471 | B1 | 11/2007 | Miles |
| 7,323,217 | B2 | 1/2008 | Lin et al. |
| 7,327,510 | B2 | 2/2008 | Cummings et al. |
| 7,369,296 | B2 | 5/2008 | Floyd |
| 7,373,026 | B2 | 5/2008 | Chui |
| 7,446,926 | B2 | 11/2008 | Sampsell |
| 7,450,295 | B2 | 11/2008 | Tung et al. |
| 7,532,386 | B2 | 5/2009 | Cummings et al. |
| 7,550,794 | B2 | 6/2009 | Miles et al. |
| 7,567,373 | B2 | 7/2009 | Chui et al. |
| 7,580,172 | B2 | 8/2009 | Lewis et al. |
| 7,643,203 | B2 | 1/2010 | Gousev et al. |
| 7,652,814 | B2 | 1/2010 | Zhong et al. |
| 7,660,031 | B2 | 2/2010 | Floyd |
| 2001/0010953 | A1 | 8/2001 | Kang et al. |
| 2001/0055208 | A1 | 12/2001 | Kimura |
| 2002/0036304 | A1 | 3/2002 | Ehmke et al. |
| 2002/0058422 | A1 | 5/2002 | Jang et al. |
| 2002/0070931 | A1 | 6/2002 | Ishikawa |
| 2002/0109899 | A1 | 8/2002 | Ohtaka et al. |
| 2002/0149850 | A1 | 10/2002 | Heffner et al. |
| 2002/0167072 | A1 | 11/2002 | Andosca |
| 2002/0171610 | A1 | 11/2002 | Siwinski et al. |
| 2002/0186209 | A1 | 12/2002 | Cok |
| 2002/0195681 | A1 | 12/2002 | Melendez et al. |
| 2003/0007107 | A1 | 1/2003 | Chae |
| 2003/0021004 | A1 | 1/2003 | Cunningham et al. |
| 2003/0053078 | A1 | 3/2003 | Missey et al. |
| 2003/0077843 | A1 | 4/2003 | Yamauchi et al. |
| 2003/0102771 | A1 | 6/2003 | Akiba et al. |
| 2003/0118920 | A1 | 6/2003 | Johnstone et al. |
| 2003/0132822 | A1 | 7/2003 | Ko et al. |
| 2003/0164350 | A1 | 9/2003 | Hanson et al. |
| 2004/0058532 | A1 | 3/2004 | Miles et al. |
| 2004/0061543 | A1 | 4/2004 | Nam et al. |
| 2004/0080035 | A1 | 4/2004 | Delapierre |
| 2004/0100594 | A1 | 5/2004 | Huibers et al. |
| 2004/0124073 | A1 | 7/2004 | Pilans et al. |
| 2004/0125281 | A1 | 7/2004 | Lin et al. |
| 2004/0125282 | A1 | 7/2004 | Lin et al. |
| 2004/0125536 | A1 | 7/2004 | Arney et al. |
| 2004/0136076 | A1 | 7/2004 | Tayebati |
| 2004/0150869 | A1 | 8/2004 | Kasai |
| 2004/0150939 | A1 | 8/2004 | Huff |
| 2004/0175577 | A1 | 9/2004 | Lin et al. |
| 2004/0191937 | A1 | 9/2004 | Patel et al. |
| 2004/0217919 | A1 | 11/2004 | Pichl et al. |
| 2004/0258415 | A1 | 12/2004 | Boone et al. |
| 2005/0012577 | A1 | 1/2005 | Pillans et al. |
| 2005/0012975 | A1 | 1/2005 | George et al. |
| 2005/0024557 | A1 | 2/2005 | Lin |
| 2005/0035699 | A1 | 2/2005 | Tsai |
| 2005/0046919 | A1 | 3/2005 | Taguchi et al. |
| 2005/0046922 | A1 | 3/2005 | Lin et al. |
| 2005/0128565 | A1 | 6/2005 | Ljungblad |
| 2005/0249966 | A1 | 11/2005 | Tung et al. |
| 2005/0250235 | A1 | 11/2005 | Miles et al. |
| 2005/0253820 | A1 | 11/2005 | Horiuchi |
| 2006/0018348 | A1 | 1/2006 | Przybyla et al. |

| | | |
|---|---|---|
| 2006/0024880 A1 | 2/2006 | Chui et al. |
| 2006/0056001 A1 | 3/2006 | Taguchi et al. |
| 2006/0066511 A1 | 3/2006 | Chui |
| 2006/0077503 A1 | 4/2006 | Palmateer et al. |
| 2006/0209386 A1 | 9/2006 | Sudak et al. |
| 2006/0261330 A1 | 11/2006 | Miles |
| 2006/0281212 A1 | 12/2006 | Moriceau et al. |
| 2007/0121205 A1 | 5/2007 | Miles |
| 2010/0079849 A1 | 4/2010 | Floyd |
| 2010/0129025 A1 | 5/2010 | Chui |

FOREIGN PATENT DOCUMENTS

| | | |
|---|---|---|
| EP | 0 667 548 | 8/1995 |
| EP | 1 170 618 | 1/2002 |
| EP | 1 243 550 | 9/2002 |
| EP | 1 452 481 | 9/2004 |
| JP | 06-281956 | 10/1994 |
| JP | 07-45550 | 2/1995 |
| JP | 09-036387 | 2/1997 |
| JP | 10-116996 | 5/1998 |
| JP | 11-243214 | 9/1999 |
| JP | 11-263012 | 9/1999 |
| JP | 2000-040831 | 2/2000 |
| JP | 2002-023068 | 1/2002 |
| JP | 2002-023070 | 1/2002 |
| JP | 2002-040238 | 2/2002 |
| JP | 2002-296521 | 10/2002 |
| JP | 2002-341267 | 11/2002 |
| JP | 2003-057571 | 2/2003 |
| JP | 2003195201 | 7/2003 |
| JP | 2004-334201 | 11/2004 |
| JP | 2005-051007 | 2/2005 |
| JP | 2005-077718 | 3/2005 |
| KR | 2002-9270 | 10/1999 |
| TW | 157313 | 5/1991 |
| WO | WO 97/17628 | 5/1997 |
| WO | WO 99/34484 | 7/1999 |
| WO | WO 03/046508 | 6/2003 |
| WO | WO 2004/000717 | 12/2003 |
| WO | WO 2004/015741 | 2/2004 |
| WO | WO 2005/066596 | 7/2005 |
| WO | WO 2005/124869 | 12/2005 |

OTHER PUBLICATIONS

Aratani K. et al. Surface Micromachined Tuneable Interferometer Array, Sensors and Actuators A, Elsevier Sequoia S.A., Lausanne, CH, A43(1/3):17-23, May 1, 1994.
Chu, et al. Formation and Microstructures of Anodic Aluminoa Films from Aluminum Sputtered onglass Substrate Journal of the Electrochemical Society, 149 (7) B321-B327 (2002).
Crouse, Self-ordered pore structure of anodized aluminum on silicon and pattern transfer Applied Physics Letters, 76(1):49-51 Jan. 3, 2000.
French, P.J. Development of Surface Micromachining techniques compatable with on-chip electronics Journal of Micromechanics and Microengineering, 6(2):97-211 Jun. (1996) IOP Publishing.
Furneaux, et al. The Formation of Controlled-porosity membranes from Anodically Oxidized Aluminium Nature vo 337 Jan. 12, 1989, pp. 147-149.
Goossen et al., Possible Display Applications of the Silicon Mechanical Anti-Reflection Switch, Society for Information Display (1994).
Hall, Integrated optical inteferometric detection method for micromachined capacitiive acoustic transducers, App. Phy. Let. 80:20(3859-3961) May 20, 200.
Kawamura et al., Fabrication of fine metal microstructures packaged in the bonded glass substrates, Proceedings of SPIE, 3893:486-493, 1999.
Kim et al., Control of Optical Transmission Through Metals Perforated With Subwavelength Hole Arrays, Optic Letters, 24(4):256-258 (Feb. 1999).
Matsumoto et al., Novel prevention method of stiction using silicon anodization for SOI structure, Sensors and Actuators, 72:2(153-159) Jan. 19, 1999.
Watanabe et al., Reduction of microtrenching and island formation in oxide plasma etching by employing electron beam charge neutralization, Applied Physics Letters, 79:17(2698-2700), Oct. 22, 2001.
Xactix Xetch X# Specifications, http:--www.xactix.com-Xtech X3specs.htm, Jan. 5, 2005.
Xactix Xetch Product Information.
ISR and WO dated Oct. 4, 2007 in PCT/US07/008089.
IPRP for PCT/US07/008089, filed Apr. 2, 2007.
Office Action dated Sep. 19, 2008 in U.S. Appl. No. 11/401,023.
Office Action dated Mar. 4, 2009 in U.S. Appl. No. 11/401,023.
Office Action dated Nov. 20, 2009 in Chinese App. No. 200780012868.1.
Office Action dated Jun. 23, 2010 in Chinese App. No. 200780012868.1, Docket No. QC0.049VCN X.
Notice of Reasons for Rejection dated Jul. 27, 2010 in Japanese App. No. 2009-505386.
Office Action dated Apr. 8, 2011 in Chinese App. No. 200780012868.1.
Office Action dated Nov. 12, 2010 in Chinese App. No. 200780012868.1.

* cited by examiner

INTERFEROMETRIC OPTICAL DISPLAY SYSTEM WITH BROADBAND CHARACTERISTICS

CROSS-REFERENCE TO RELATED APPLICATIONS

This application is a divisional of U.S. application Ser. No. 11/401,023, titled "Interferometric Optical Display System with Broadband Characteristics," filed Apr. 10, 2006, which is hereby incorporated by reference in its entirety.

BACKGROUND

1. Field of the Invention

This invention relates to microelectromechanical systems for use as interferometric modulators (iMoD). More particularly, this invention relates to systems and methods for improving the manufacture of interferometric modulators.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

An embodiment provides a method for making a MEMS display device that comprises providing a transparent substrate and forming an array of interferometric modulators on the transparent substrate, wherein the interferometric modulator comprises a material having an extinction coefficient (k) below a threshold value for wavelengths of light within an operative optical range of the interferometric modulator.

Another embodiment provides a method for forming an array of interferometric modulators that comprises forming an optical stack on the transparent substrate, depositing a sacrificial layer over the optical stack, forming an electrically conductive layer over the sacrificial layer, and removing at least a portion of the sacrificial layer to thereby form a cavity between the substrate and the electrically conductive layer.

Another embodiment provides a MEMS display device made by a method comprising providing a transparent substrate and forming an array of interferometric modulators on the transparent substrate, wherein the interferometric modulator comprising a material having a refractive index that increases as the wavelength increases.

Another embodiment provides an interferometric display device comprising means for transmitting light and means for interferometrically reflecting light through said transmitting means, wherein said reflecting means comprises a material having an extinction coefficient (k) below a threshold value for wavelengths of light within an operative optical range of the interferometric modulator.

Another embodiment provides a MEMS display device comprising a substrate and an array of interferometric modulators deposited on said substrate, wherein said array comprises a material having an extinction coefficient (k) below a threshold value for wavelengths of light within an operative optical range of the interferometric modulator. The display device of this embodiment further comprises a processor that is in electrical communication with the array, the processor being configured to process image data, and a memory device in electrical communication with the processor.

These and other embodiments are described in greater detail below.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment of the invention is a display device that uses a material having an extinction coefficient (k) below a threshold value for wavelengths of light within an operative optical range of the interferometric modulator. Another embodiment may use a material having a refractive index (n) that increases and/or an extinction coefficient (k) that decreases as the wavelength increases within an operative optical range. As one example, the material can be germanium or germanium based alloys (such as $Si_xGe_{1-x}$). Display devices that include this material are capable of reflecting a broadband white color when in a "bright" state without affecting the level of darkness of the device when it is in a "dark" state. In one embodiment, germanium layer is used within an absorber layer of an interferometric device to provide a device that reflects broadband white light to a viewer. In another embodiment, the material is in combination with a metal in a stacked layered structure. The metal allows for additional fine tuning of the display device's optical performance. In particular, the addition of a metal layer adjacent to the material allows for a reduced reflectance (darkness) in the dark state and therefore improves the contrast ratio of the display device. Of course, it should be realized that embodiments of the invention are not limited to these, or any, particular thicknesses of layers.

Figure 1:
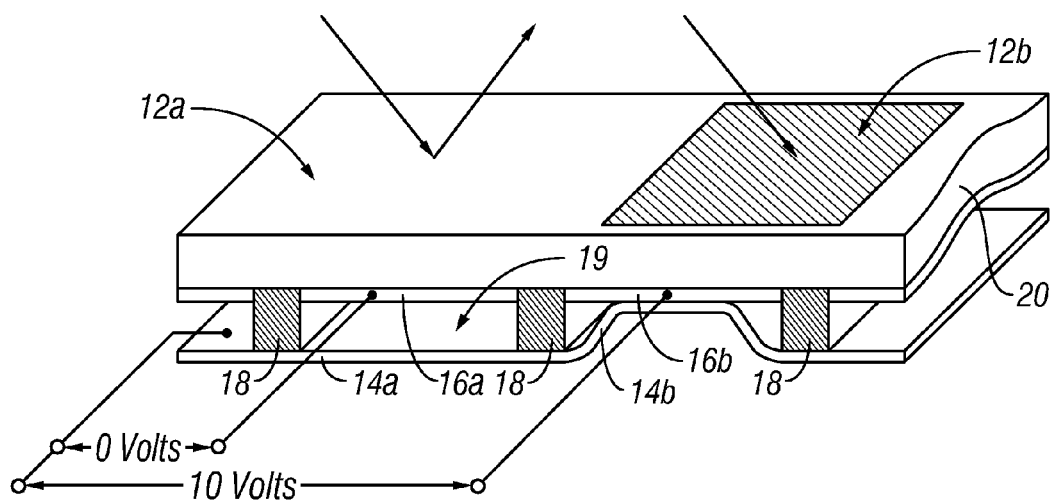
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
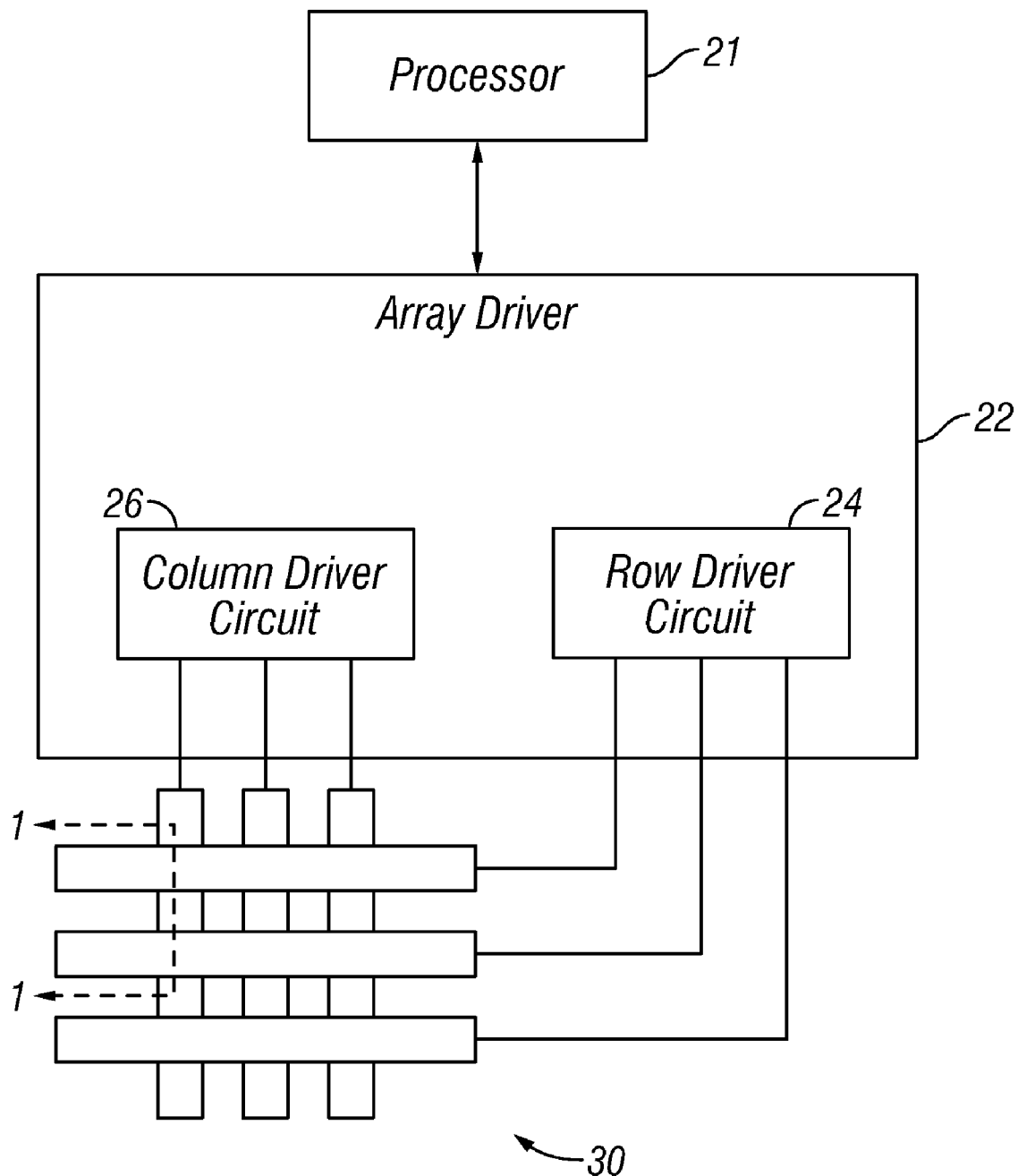
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
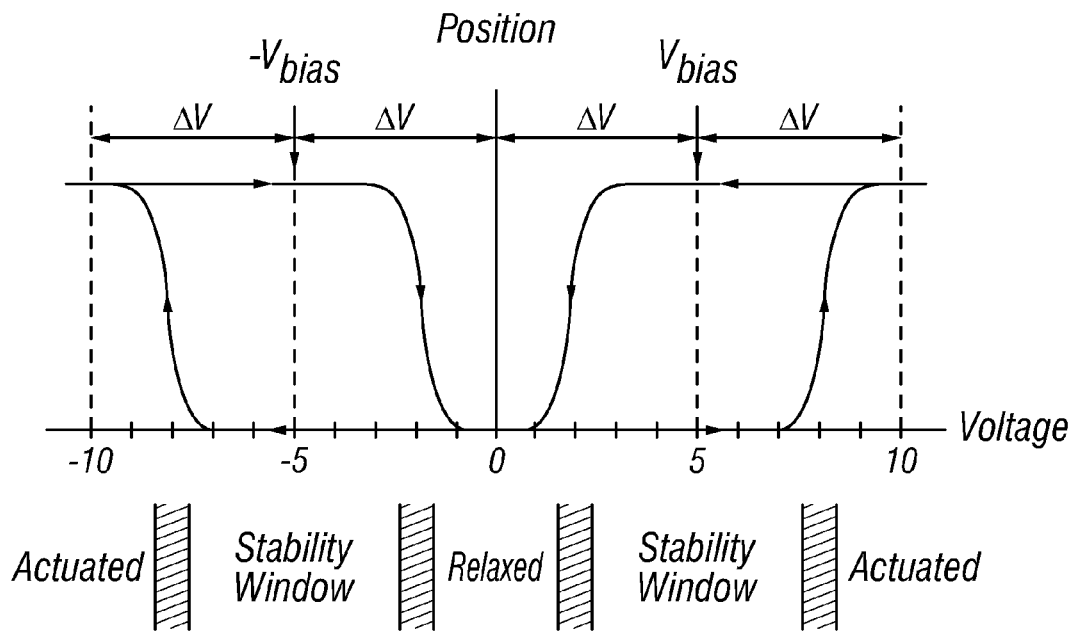
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
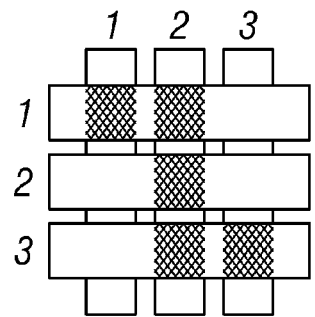
FIG. 5A illustrates one exemplary frame of display data in the 3×3 interferometric modulator display of FIG. 2.
Figure 5B:
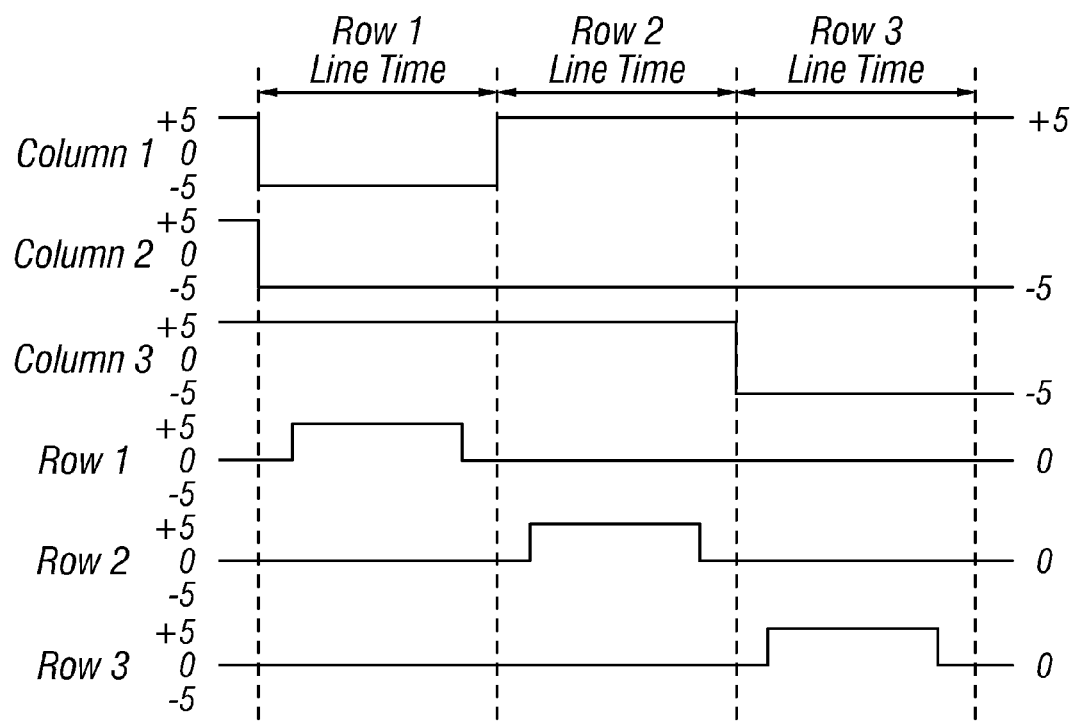
FIG. 5B illustrates one exemplary timing diagram for row and column signals that may be used to write the frame of FIG. 5A.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
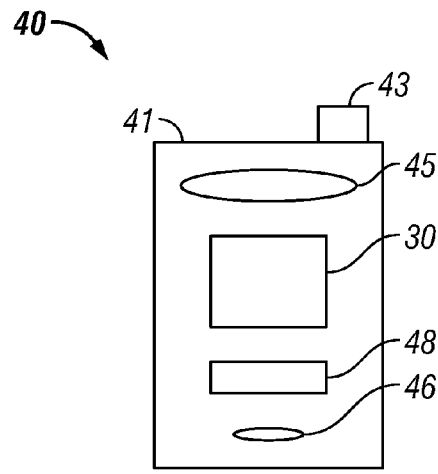
FIGS. 6A and 6B are system block diagrams illustrating an embodiment of a visual display device comprising a plurality of interferometric modulators.
Figure 6B:
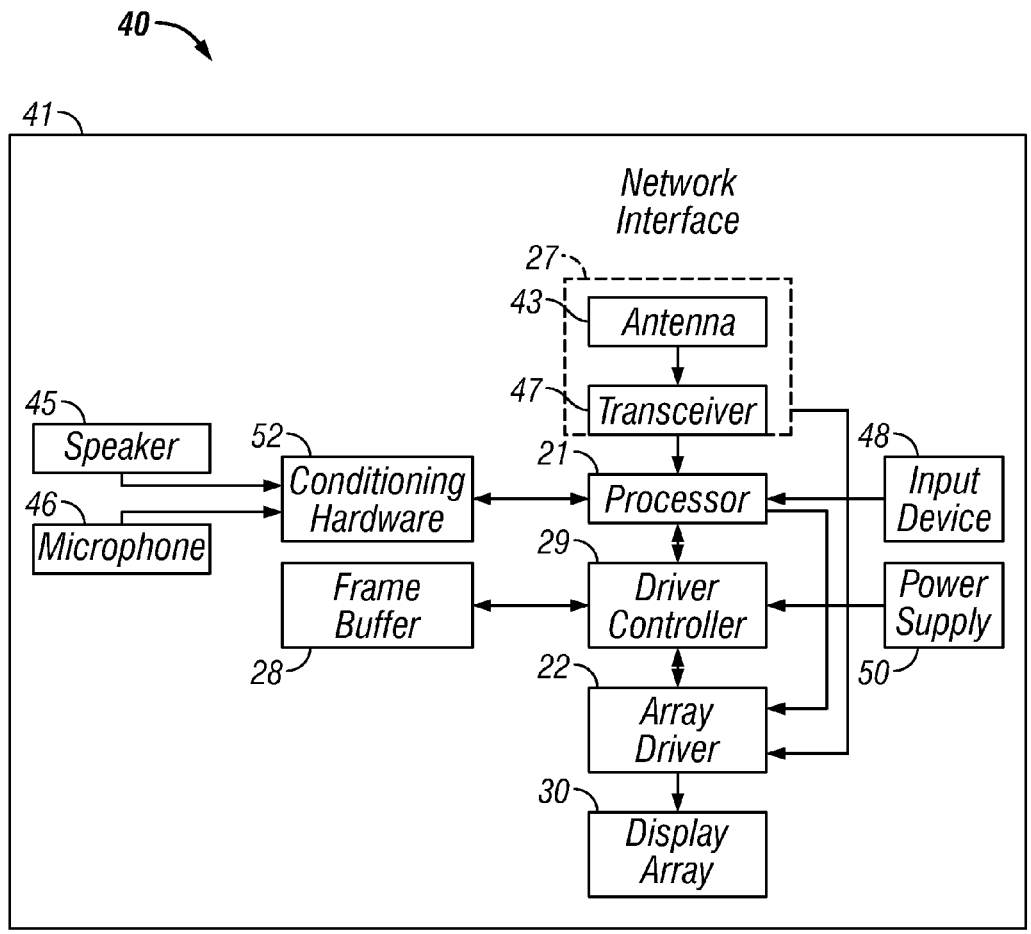

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, a microphone 46 and an input device 48. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of the exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of the exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, the network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to the frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. The conditioning hardware 52 generally includes amplifiers and filters for transmitting signals to the speaker 45, and for receiving signals from the microphone 46. The conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, the input device 48 includes a keypad, such as a QWERTY keyboard or a telephone keypad, a button, a switch, a, touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell, including a plastic solar cell, and solar-cell paint. In another embodiment, the power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
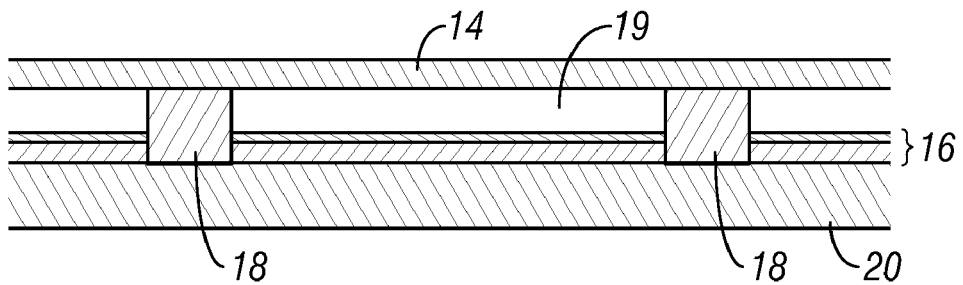
FIG. 7A is a cross section of the device of FIG. 1.
Figure 7B:
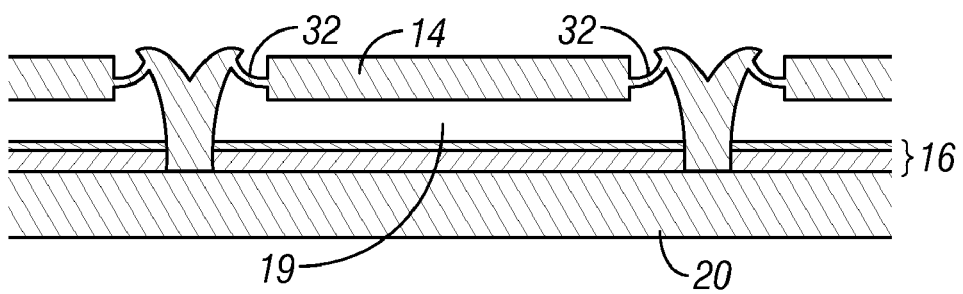
FIG. 7B is a cross section of an alternative embodiment of an interferometric modulator.
Figure 7C:
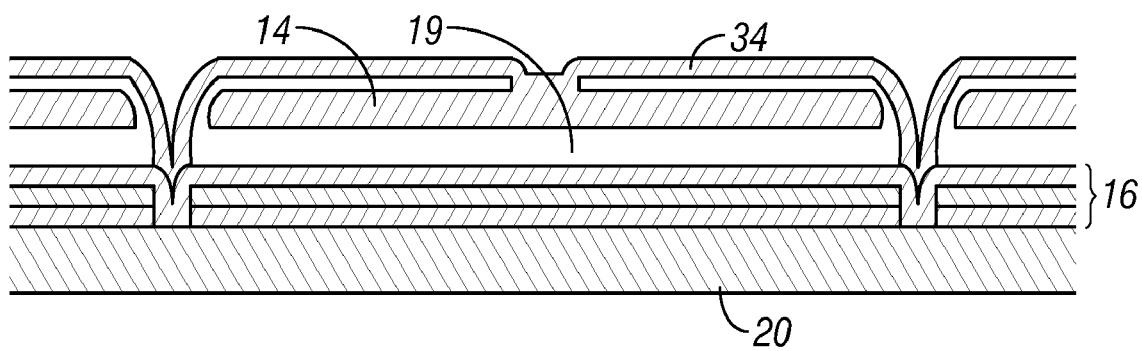
FIG. 7C is a cross section of another alternative embodiment of an interferometric modulator.
Figure 7D:
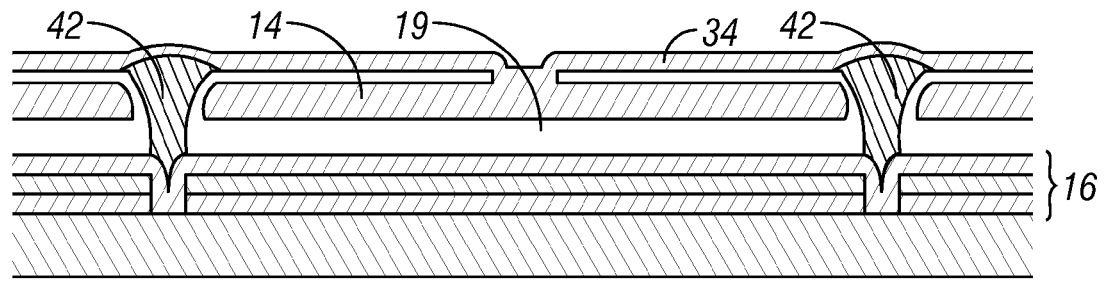
FIG. 7D is a cross section of yet another alternative embodiment of an interferometric modulator.
Figure 7E:
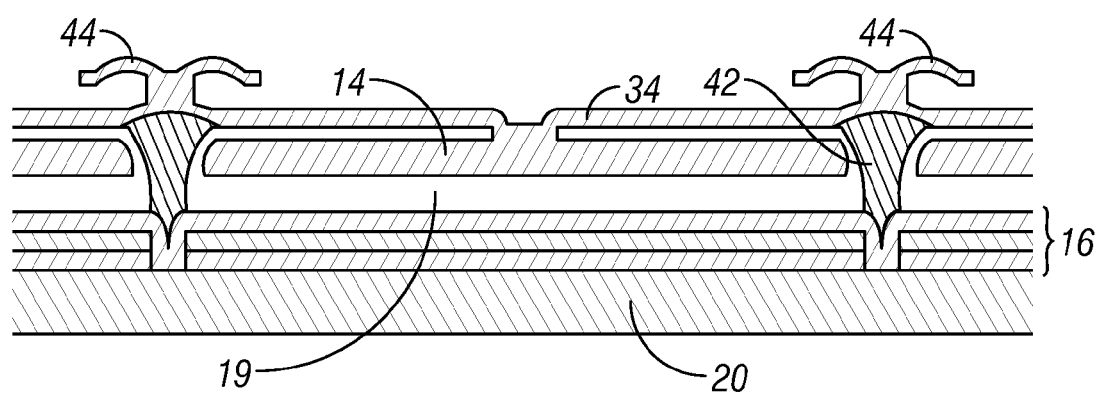
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and their supporting structures. FIG. 7A is a cross section of the embodiment of FIG. 1, where a strip of metal material 14 is deposited on orthogonally extending support structures 18. In FIG. 7B, the movable reflective layer 14 is attached to supports at the corners only, on tethers 32. In FIG. 7C, the movable reflective layer 14 is suspended from a deformable layer 34, which may comprise a flexible metal. The deformable layer 34 connects, directly or indirectly, to the substrate 20 around the perimeter of the deformable layer 34. These connections may be referred to herein as support posts. The embodiment illustrated in FIG. 7D has support structures 18 that include support post plugs 42 upon which the deformable layer 34 rests. The movable reflective layer 14 remains suspended over the cavity, as in FIGS. 7A-7C, but the deformable layer 34 does not form the support posts 18 by filling holes between the deformable layer 34 and the optical stack 16. Rather, the support posts 18 comprise a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44 (FIG. 7E). This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

One embodiment provides a method of making a MEMS display device comprising providing a transparent substrate and forming an array of interferometric modulators on the transparent substrate, wherein the interferometric modulator comprising a material having an extinction coefficient (k) below a threshold value for wavelengths of light within an operative optical range of the interferometric modulator. Forming an array of interferometric modulators comprises forming an optical stack on the transparent substrate, depositing a sacrificial layer over the optical stack, forming an electrically conductive layer over the sacrificial layer, and removing at least a portion of the sacrificial layer to thereby form a cavity between the substrate and the electrically conductive layer.

Figure 8:
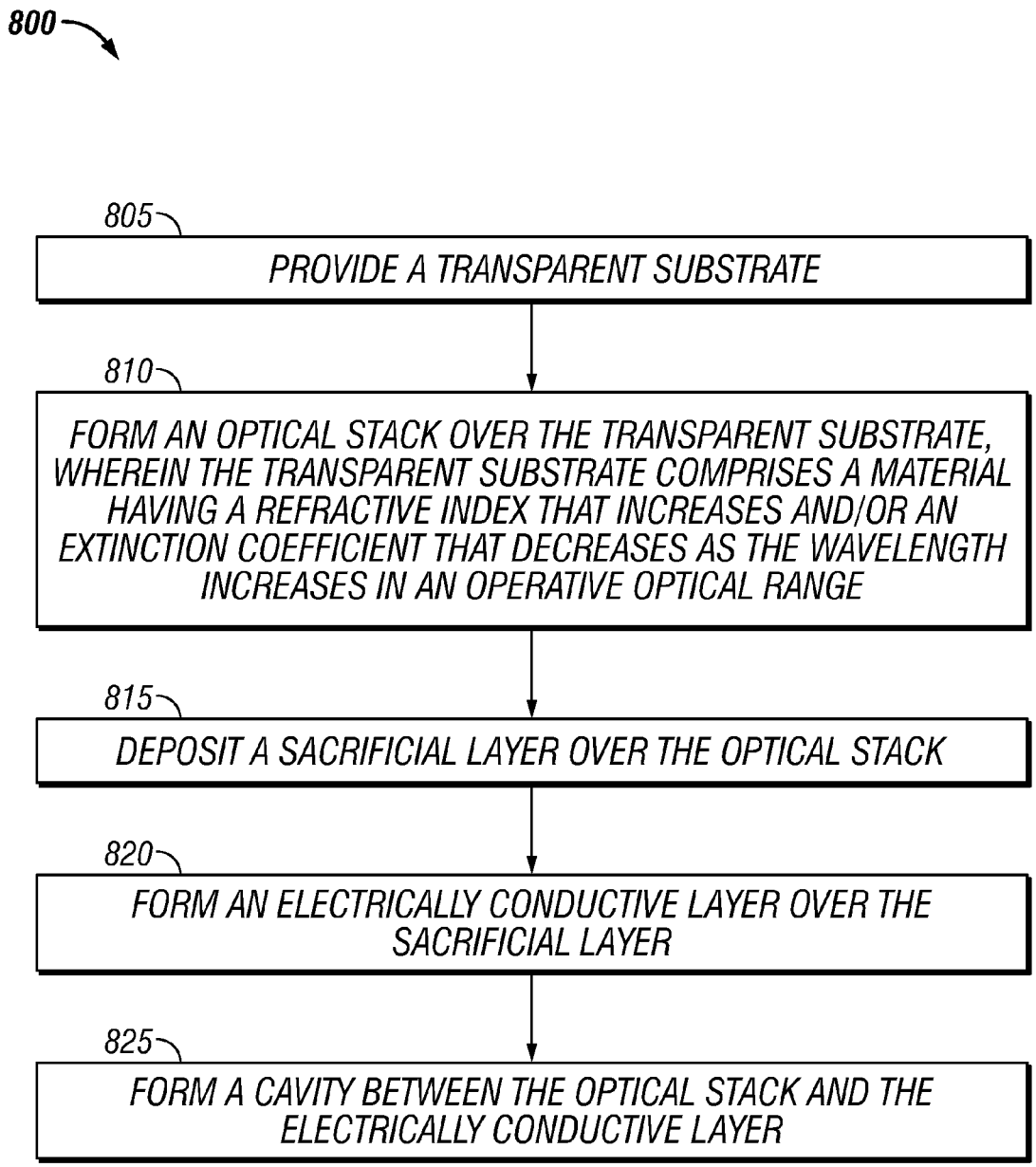
FIG. 8 is a flow diagram illustrating certain steps in an embodiment of a method of making an interferometric modulator.
Figure 9A:
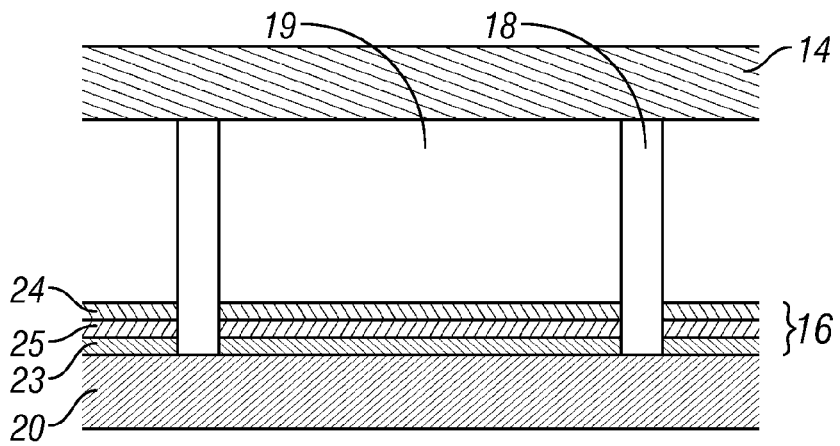
FIG. 9A is a cross section of an embodiment of an interferometric modulator.
Figure 9B:
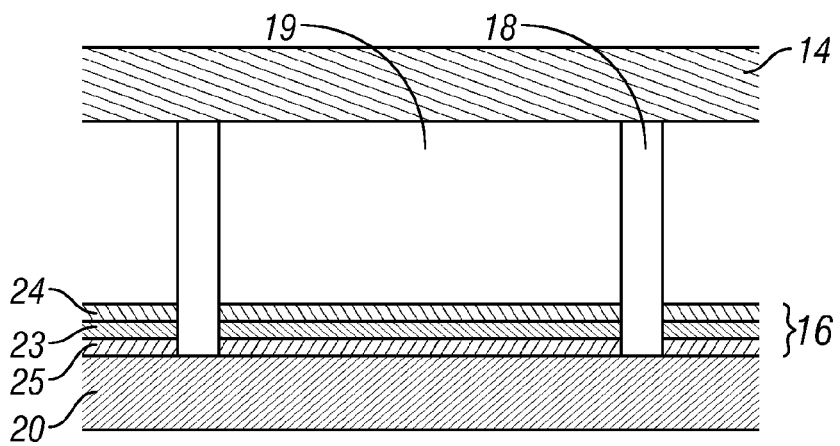
FIG. 9B is a cross section of an alternative embodiment of an interferometric modulator.
Figure 9C:
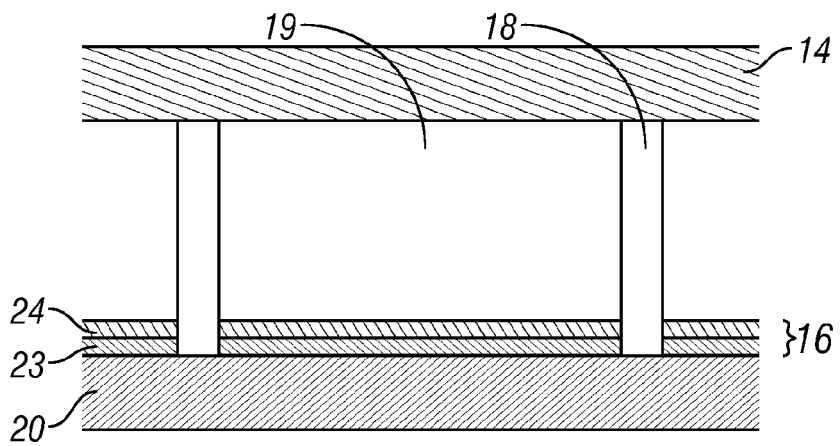
FIG. 9C is a cross section of another alternative embodiment of an interferometric modulator.

FIG. 8 illustrates certain steps in an embodiment of a manufacturing process 800 for an interferometric modulator that reflects broadband white light. Such steps may be present in a process for manufacturing, e.g., interferometric modulators of the general type illustrated in FIGS. 1, 7 and 9, along with other steps not shown in FIG. 8. With reference to FIGS. 8 and 9A, the process 800 begins at step 805 wherein a transparent substrate is provided. In some embodiments, the transparent substrate 20 is glass, plastic or other material that is transparent to light, yet can support fabrication of an interferometric modulator array. Those skilled in the art will appreciate that the term "transparent" as used herein encompasses materials that are substantially transparent to the operational wavelength(s) of the interferometric modulator, and thus transparent substrates need not transmit all wavelengths of light and may absorb a portion of the light at the operational wavelength(s) of the interferometric modulator. In some embodiments, the transparent substrate 20 may be a large-area display.

The process 800 continues at step 810 with the formation of the optical stack 16 over the transparent substrate 20. As discussed above, the optical stack 16 is electrically conductive, partially transparent and partially reflective, and may be fabricated, for example, by depositing one or more of the layers onto the transparent substrate 20. In some embodiments, the layers are patterned into parallel strips, and may form row electrodes in a display device. In some embodiments, the optical stack 16 includes a dielectric layer 24 that is deposited over one or more layers of partially reflective material 23 (e.g., the material).

With reference to FIG. 9A as an example of one embodiment, forming the optical stack 16 comprises depositing a partially reflective material 23 (e.g., the material) over at least a portion of the substrate 20 and depositing a dielectric layer 24 over the partially reflective material 23. Typically, the thickness of the dielectric layer is from about 100 to about 800 Angstroms (Å). The partially reflective material 23 (e.g., the material) has an extinction coefficient (k) below a threshold value for wavelengths of light within an operative optical range of the interferometric modulator. In one embodiment, the threshold value for k is about 2.5. In some embodiments, the partially reflective material 23 may have a k value that remains substantially constant for wavelengths of light within an operative optical range of the interferometric modulator. In yet some other embodiments, the k value of the partially reflective material 23 may decrease as the wavelength of light increases within the operative optical range of the interferometric modulator. Some embodiments may also have a partially reflective material with a refractive index (n) that increases as the wavelength of light increases within the operative optical range of the interferometric modulator. The operative optical range of the interferometric modulator may be from about 300 nm to about 800 nm wavenumbers, preferably from about 350 nm to about 750 nm, and more preferably from about 400 nm to about 700 nm. In some embodiments, the partially reflective material 23 (e.g., the material) comprises a silicon germanium alloy (e.g., $Si_xGe_{1-x}$). In another embodiment, the partially reflective material 23 (e.g., the material) may be germanium. The thickness of the partially reflective layer can be from about 20 to about 400 Å, preferably about 50 to about 200 Å. In some embodiments, the various compositions of $Si_xGe_{1-x}$ (x=0-1) may be obtained by varying the x and y values, and this variation may be used for "fine-tuning" of the n and k parameters which in turn will result in the ability to tune spectral properties of reflected broadband white light of high intensity. In other embodiments, n and k properties of the partially reflective material 23 (e.g., the material) can be tuned by doping germanium or germanium-containing alloy (e.g., $Si_xGe_{1-x}$) with impurities at a concentration in the range of about 0.01% to about 10%. The impurities may be, but not limited to, B, P, As, C, In, Al, or Ga. In one embodiment the partially reflective material 23 has an n to k ratio from about 2.5 to about 6. In another embodiment, the partially reflective material 23 has an n to k ratio of about 3.

Another embodiment is directed to the formation of a germanium rich layer on the transparent substrate with a $SiO_2$-like layer over the germanium rich layer. In this embodiment, forming the optical stack comprises depositing a germanium-containing alloy (e.g., $Si_xGe_{1-x}$) on the substrate, and thermally oxidizing the deposited $Si_xGe_{1-x}$ alloy in oxidizing ambient such as $O_2$, $N_2O$, $O_3$ or NO where Si is preferentially oxidized to form a transparent silicon oxide dielectric layer, leaving behind a layer of germanium rich partially reflective material with desired n & k properties. In some embodiments, the thickness of the deposited germanium-containing alloy may be about 20 to about 500 Å.

In another embodiment, the partially reflective material 23 is in combination with a metal in a stacked layered structure. The metal layer comprises a material selected from the group consisting of chromium, molybdenum, refractive materials and refractive alloys. The metal allows for additional fine tuning of the display device's optical performance. In particular, the addition of a metal layer adjacent to the material allows for a reduced reflectance (darkness) in the dark state and therefore improves the contrast ratio of the display device. In one embodiment, the chromium layer is from 1 to 50, 10 to 40, or 25-35 Å in thickness. In another embodiment, the metal layer is from 1 to 50, 10 to 40, or 25-35 Å in thickness.

The process 800 illustrated in FIG. 8 continues at step 815 with the deposition of a sacrificial layer over the optical stack 16. The sacrificial layer is later removed (e.g., at step 830) to form the cavity 19 as discussed below and thus the sacrificial layer is not shown in the resulting interferometric modulator 12 illustrated in FIGS. 1, 7 and 9. The formation of the sacrificial layer over the optical stack 16 may include deposition of a $XeF_2$-etchable material such as molybdenum, tungsten or amorphous silicon, in a thickness selected to provide, after subsequent removal, a cavity 19 having the desired size. In some embodiments, the sacrificial layer may be a heat vaporizable material (e.g., organic polymer). A heat vaporizable material is a solid material that vaporizes upon heating to a vaporization temperature, such that substantially all of the polymer (e.g., >95% by weight) is vaporized. The vaporization temperature range is preferably high enough such that the heat vaporizable material remains intact at normal fabrication temperatures, but low enough to avoid damaging other materials present during vaporization. In one embodiment, the heat vaporizable material is a heat vaporizable polymer. A variety of heat vaporizable polymers may be used. For example, one such heat vaporizable material is a heat-depolymerizable polycarbonate (HDP) such as poly(cyclohexene carbonate), an aliphatic polycarbonate that may be made from $CO_2$ and an epoxide, see U.S. Pat. No. 6,743,570 B2. Other HDP's may also be used.

Deposition of optical stack and sacrificial material may be carried out using conventional deposition techniques such as physical vapor deposition (PVD, e.g., sputtering), plasma-enhanced chemical vapor deposition (PECVD), thermal chemical vapor deposition (thermal CVD), molecular beam deposition, spin-coating, ion implantation, ion-beam assisted deposition, electroplating, or pulse laser deposition (PLD). The sacrificial layer may be deposited in select locations by, e.g., printing techniques, one of which is inkjet deposition. In one embodiment the sacrificial layer is printed onto locations adjacent to post structure locations (already deposited post structures or to-be-deposited post structure locations).

In some embodiments a support structure formation step (not shown in FIG. 9) may take place after step 815 and before the formation of the electrically conductive layer 14 in step 820. The formation of the post 18 as shown in FIGS. 1, 7 and 9 may include the steps of patterning the sacrificial layer to form a support structure aperture, then depositing a non-conductive material (e.g., a polymer) into the aperture to form the post 18, using a deposition method such as PECVD, thermal CVD, spin-coating, ion implantation, ion-beam deposition, or PLD. The patterning step may comprise techniques such as electron beam lithography and image transfer. Step 820 may then form the electrically conductive layer 14 over the sacrificial layer and over the post such that the post will support the electrically conductive layer 14 after removal of the sacrificial layer in step 825.

In some embodiments, the support structure aperture formed in the sacrificial layer extends through both the sacrificial layer and the optical stack 16 to the underlying substrate 20, so that the lower end of the post 18 contacts the substrate 20 as illustrated in FIG. 7A. In other embodiments, the aperture formed in the sacrificial layer extends through the sacrificial layer, but not through the optical stack 16. For example, FIG. 7C illustrates the lower end of the support post plugs 42 in contact with the optical stack 16. In one embodiment, $XeF_2$-etchable materials may be used in forming at least part of the post structure. $XeF_2$-etchable materials suitable for the post structure include molybedenum and silicon-containing materials, such as silicon itself (including amorphous silicon, polysilicon, and crystalline silicon), as well as silicon germanium and silicon nitride. In another embodiment, the post or post structures can be a polymer.

The process 800 illustrated in FIG. 8 continues at step 820 with the formation of a movable reflective layer such as the movable reflective layer 14 illustrated in FIGS. 1, 7 and 9. The movable reflective layer 14 may be formed by employing one or more deposition steps, e.g., reflective layer (e.g., aluminum, aluminum alloy) deposition, along with one or more patterning, masking, and/or etching steps. As discussed above, the movable reflective layer 14 is typically electrically conductive, and may be referred to herein as an electrically conductive layer. Since the sacrificial layer is still present in the partially fabricated interferometric modulator formed at step 820 of the process 800, the movable reflective layer 14 is typically not movable at this stage. A partially fabricated interferometric modulator that contains a sacrificial layer may be referred to herein as an "unreleased" interferometric modulator.

The process 800 illustrated in FIG. 8 continues at step 825 with the formation of a cavity, e.g., a cavity 19 as shown in FIGS. 1, 7 and 9. The cavity 19 may be formed by exposing the sacrificial material (deposited at step 815) to an etchant. For example, an etchable sacrificial material such as molybdenum or amorphous silicon may be removed by dry chemical etching, e.g., by exposing the sacrificial layer to a gaseous or vaporous etchant, such as vapors derived from solid xenon difluoride ($XeF_2$) for a period of time that is effective to remove the desired amount of material, typically selectively relative to the structures surrounding the cavity 19. Other etching methods, e.g. wet etching and/or plasma etching, may also be used. In some embodiments, the vaporizing step 825 comprises heating. Heating may be done on a heated plate, in an oven, in a kiln or by using any heating device capable of achieving and maintaining a temperature sufficient to vaporize the heat vaporizable material for a long enough time that substantially all of the sacrificial material vaporizes. Since the sacrificial layer is removed during step 825 of the process 800, the movable reflective layer 14 is typically movable after this stage. After removal of the sacrificial material, the resulting fully or partially fabricated interferometric modulator may be referred to herein as a "released" interferometric modulator. In some embodiments, the process 800 may include additional steps and the steps may be rearranged from the illustrations of FIG. 8.

FIGS. 9A to 9E illustrate various embodiments of a MEMS display device comprises a substrate 20 and an array of interferometric modulators deposited on said substrate 20, wherein said array comprises a material 23 having an extinction coefficient (k) below a threshold value for wavelengths of light within an operative optical range of the interferometric modulator. The substrate 20 may be a large-area transparent substrate, such as glass, plastic or other material that is transparent to the light. Therefore the transparent substrate is also a means for transmitting light. An interferometric modulator is also a means for interferometrically reflecting light through the transmitting means (e.g., transparent substrate). The interferometric modulator may comprise an optical stack 16, an electrically conductive layer 14 (e.g., a movable layer), a support structure (e.g., posts or post structures 18), and a cavity 19 separating the optical stack from the electrically conductive layer. The material 23 (e.g., partially reflective layer) typically has a dispersion/extinction coefficient behavior that is capable of compensating the wavelength variation of the insulating or dielectric layer and the air in the cavity. In one embodiment, said material has a dispersion/extinction coefficient curve as illustrated in FIG. 10. FIG. 10 shows the dispersion/extinction coefficient behavior of germanium possessing an increasing refractive index and a decreasing extinction coefficient as the wavelength increases within the operative optical range. A material with similar dispersion and/or extinction coefficient behavior allows a high overall reflectance without compromising the favorable high level of visible light absorption at the dark/off state. In some embodiments, the overall reflectance may be about 30% to about 70% in the operative optical range. A typical thickness of the material layer 23 (e.g., germanium, germanium alloy, doped germanium or doped germanium-containing alloy layer) can be in the range of about 50 to about 200 Å.

In some embodiments, the partially reflective material 23 (e.g., the material) can be deposited over the transparent substrate 20. In one embodiment, a transparent conductive material 25 (e.g., ITO or other transparent conductive oxide such as ZnO) can be deposited over the partially reflective material 23 (see FIG. 9A). In another embodiment, the partially reflective material 23 (e.g., the material) may be deposited over the transparent conductive material 25 (see FIG. 9B). In this case, the transparent conductive material 25 may be deposited over at least a portion of the substrate prior to depositing the partially reflective material 23 (e.g., the material). The transparent conductive material 25 may be any optically transparent conductive materials and the typical thickness is from about 100 to about 800 Å. The thickness of the transparent conductive material 25 is determined by the position of the layer and the desired cavity size. In some embodiments, the transparent conductive material 25 comprises a tin-based oxide, antimony-based oxide, or indium-based oxide. In another embodiment shown in FIG. 9C, the transparent conductive material 25 (e.g., ITO) may be omitted since the germanium or germanium-containing alloy layer itself can also be configured to function as a conductive layer, especially when doped by group III (e.g., B, Al or Ga) or group V (e.g., P, As or Sb) elements.

Figure 9D:
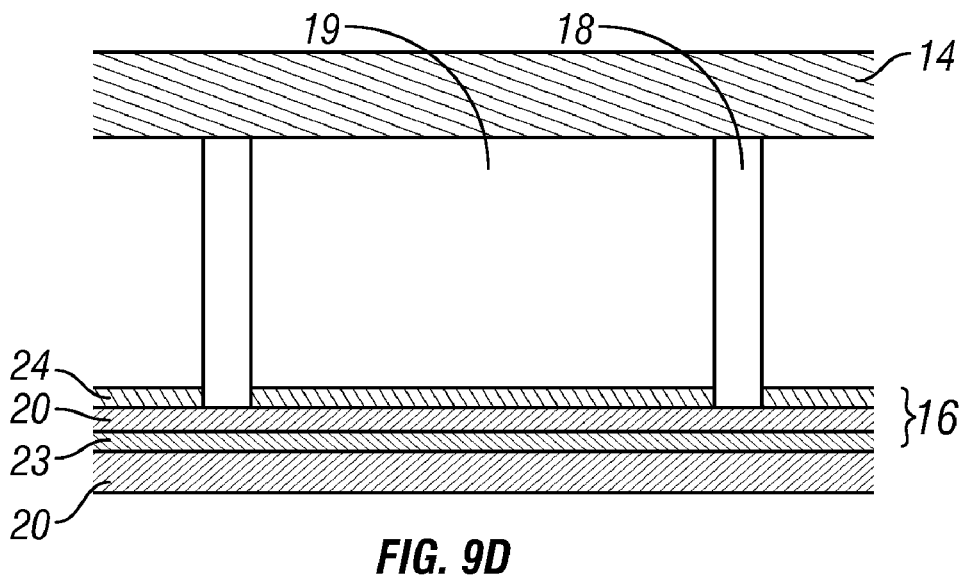
FIG. 9D is a cross section of yet another embodiment of an interferometric modulator.
Figure 9E:
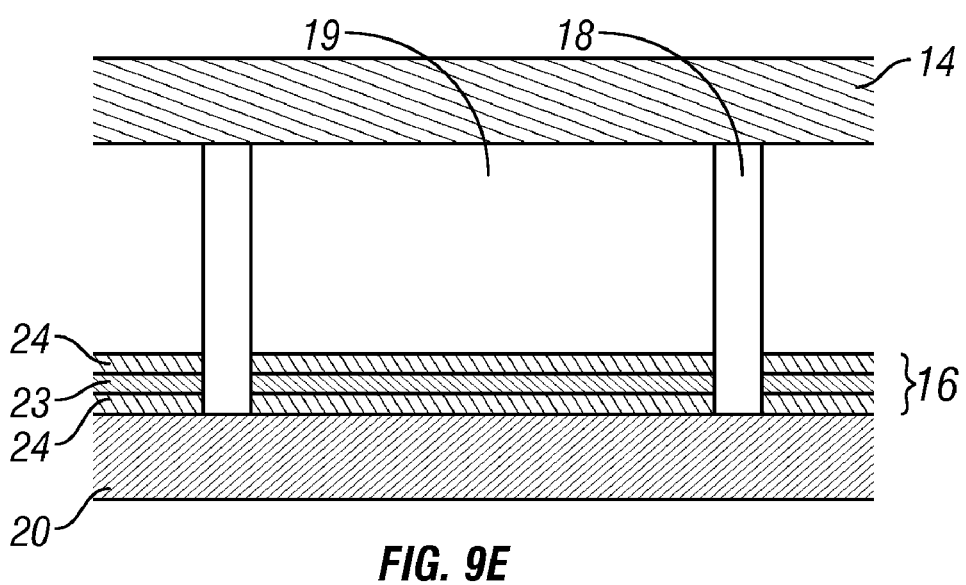
FIG. 9E is a cross section of an additional embodiment of an interferometric modulator.
Figure 10:
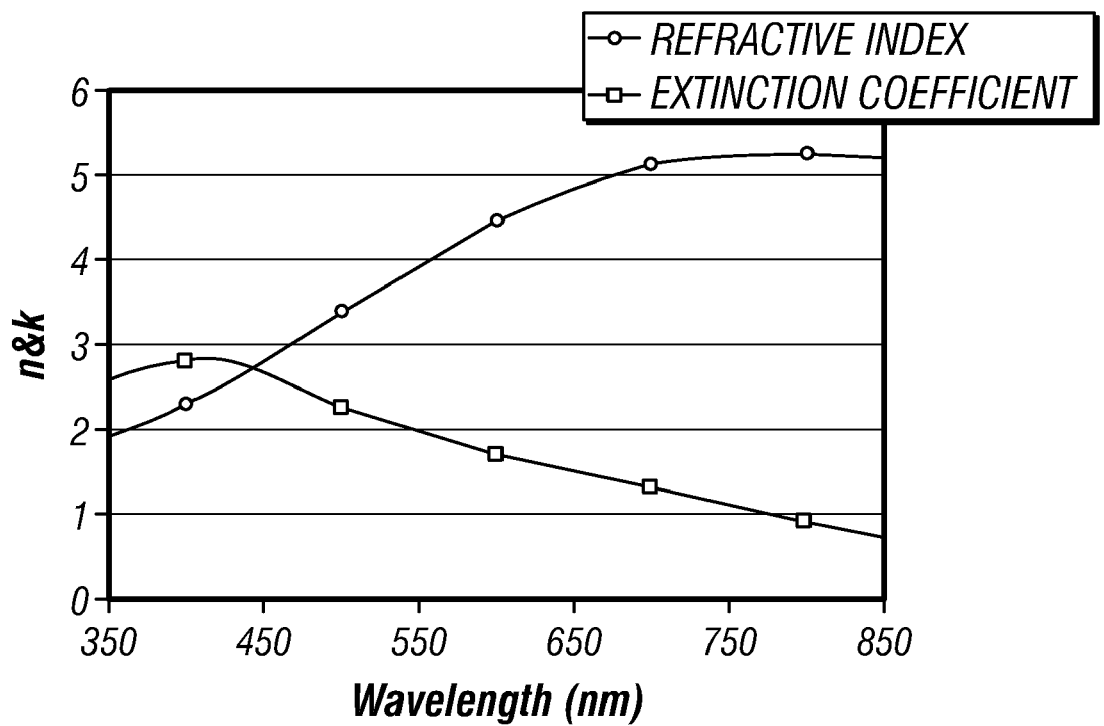
FIG. 10 is a dispersion curve illustrating a material (e.g., Ge) with a refractive index that increases and the extinction coefficient (k) decreases as the wavelength increases within an operative optical range of the interferometric modulator.

In another embodiment illustrated in FIG. 9D, the partially reflective material 23 (e.g., the material) may be integrated within the transparent substrate 20. The transparent substrate 20 may be doped with the partially reflective material 23. This can be done by ion implantation of the material into the substrate 20 and allowing the material to form a band or a layer of partially reflective material 23 within the substrate using any known semiconductor processing techniques. In this embodiment, the part of substrate that comprises the material can be considered a part of the optical stack 16. In yet another embodiment shown in FIG. 9E, a band of the partially reflective material 23 can be integrated within the dielectric layer 24 (e.g., insulating layer). For example, a thin dielectric layer (e.g., $SiO_2$) is deposited first, then the partially reflective material 23 is deposited over it, and finally more $SiO_2$ is deposited over the partially reflective material 23. Optionally, a transparent conductive material 25 (e.g., ITO) can be deposited over the substrate as an electrical conductor before depositing the insulating or dielectric layer 24.

Example 1

An interferometric modulator device simulation was modeled based on one embodiment of the unreleased interferometric modulator shown in FIG. 11. The modeled structure included a glass substrate 20, an optical stack 16 on the glass substrate 20, a cavity 19 separating the optical stack 16 and an Al reflective layer 14. The optical stack 16 contains an ITO layer 102 over the substrate 20, a partially reflective material 23 over the ITO layer 102, and a dielectric layer 24 over the partially reflective material 23. For this example, Ge was used as the partially reflective material 23. By varying the thicknesses of ITO layer, Ge, and dielectric layers, characteristics of the interferometric modulator, such as contrast, reflectance, white balance, or the combination thereof were able to be optimized. A PC software program, The Essential Macleod from Thin Film Center Inc. (Tucson, Ariz.) was used to calculate the reflectance and transmittance of the stack as function of wavelength based on thicknesses, refractive indexes (n) and extinction coefficients (k) of each layers.

The optimal input thicknesses of the layers in this simulation were 330 Å for the ITO layer 102, 99 Å of Ge for the partially reflective material 23, 119 Å of $SiO_2$ and 80 Å of $Al_2O_3$ for the dielectric layer 24, and 300 Å for the Al reflective layer 14. The cavity 19 has a 1900 Å separation in the bright state (FIG. 11A) and 0 Å in the dark state (FIG. 11B). Simulated spectral response of a broadband white interferometric modulator using Ge as the partially reflective layer (e.g., the absorber) showed more than 50% reflectance in its bright state, and a contrast between the bright and dark states of 100:1 (FIG. 12).

Example 2

Another interferometric modulator device simulation was modeled based on one embodiment of the unreleased interferometric modulator shown in FIG. 11. The modeled structure included a glass substrate 20, an optical stack 16 on the glass substrate 20, a cavity 19 separating the optical stack 16 and an Al reflective layer 14. The optical stack 16 contains an ITO layer 102 over the substrate 20, a partially reflective material 23 over the ITO layer 102, and a dielectric layer 24 over the partially reflective material 23. However, a metal layer (e.g. Cr or Mo) was modeled either over or under the partially reflective material 23 in this example. By varying the thicknesses of ITO, Ge, metal layer and dielectric layer, characteristics of the interferometric modulator, such as contrast, reflectance, white balance, or the combination thereof were able to be optimized. The Essential Macleod software program from Thin Film Center Inc. (Tucson, Ariz.) was used to calculate the reflectance and transmittance of the stack as function of wavelength based on thicknesses, refractive indexes (n) and extinction coefficients (k) of each layers.

The optimal input thicknesses of the layers in this simulation were 330 Å for the ITO layer, 100 Å for the Ge layer, 10-40 Å of Cr, 119 Å of $SiO_2$ and 80 Å of $Al_2O_3$ for the dielectric layers, and 300 Å for the Al layer. The cavity 19 had a 1850 Å separation in the bright state and 0 Å in the dark state. The combination of Ge with a metal (e.g., Cr or Mo) as an absorber is capable of improving contrast by about 25%.

Example 3

Figure 13A:
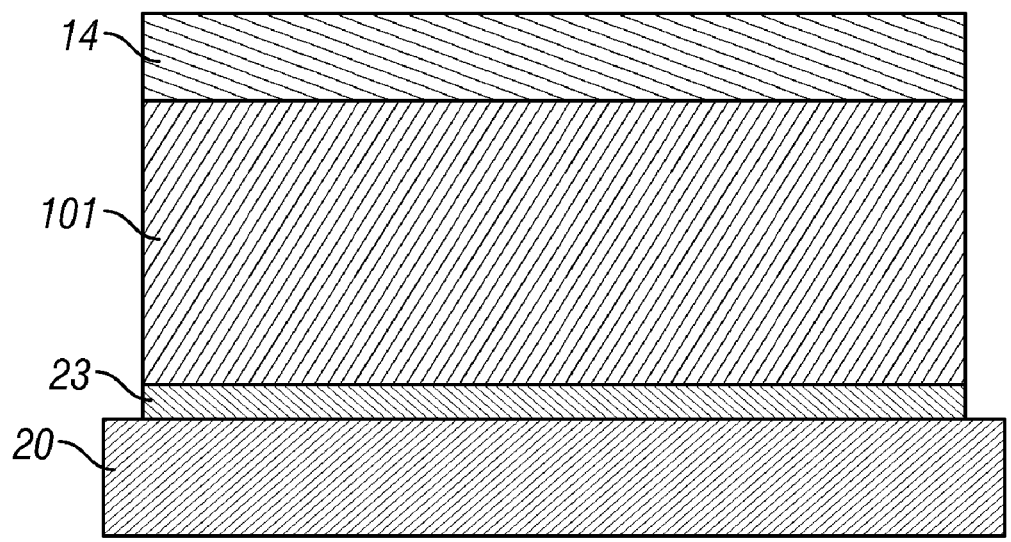
FIG. 13A is a cross section of one embodiment of an unreleased interferometric modulator corresponding to a released interferometric modulator in bright state.
Figure 13B:
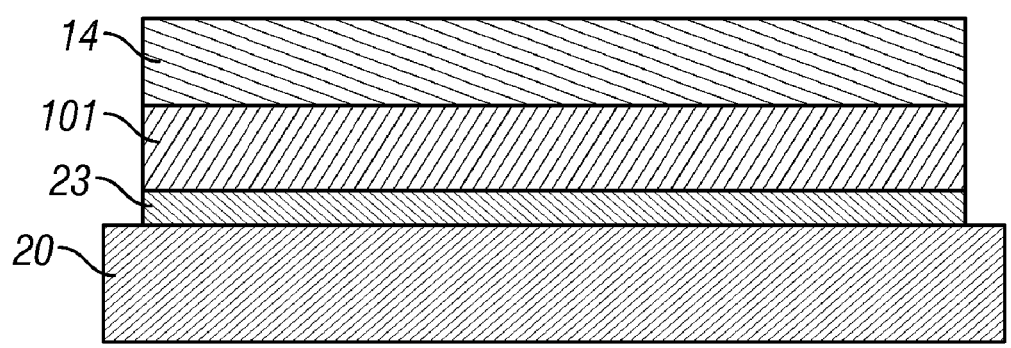
FIG. 13B is a cross section of one embodiment of an unreleased interferometric modulator corresponding to a released interferometric modulator in dark state.

Unreleased interferometric modulators as shown in FIG. 13 were made by depositing of 90 Å of Ge as a partially reflective layer 23 on a glass substrate 20. A $SiO_2$ insulating layer 101 was deposited on the Ge layer, and then an Al reflective layer 14 with a thickness of greater than 300 Å was deposited over the $SiO_2$ layer 101. A $SiO_2$ insulating layer 101 in an unreleased interferometric modulator represents the cavity in a released interferometric modulator. The thickness of the $SiO_2$ insulating layer 101 equals the distance of separation between the partially reflective layer 23 and the Al reflective layer 14 (i.e., the movable layer in a released interferometric modulator). Devices with both 450 Å and 1080 Å $SiO_2$ layer were prepared. The device with a 450 Å $SiO_2$ layer (FIG. 13B) is equivalent to a released interferometric modulator in a dark state, while the 1080 Å $SiO_2$ device (FIG. 13A) is equivalent to a released interferometric modulator in a bright state. Spectral responses of both devices were measured and compared to the simulated data generated using The Essential Macleod software program from Thin Film Center Inc. (Tucson, Ariz.).

Figure 14:
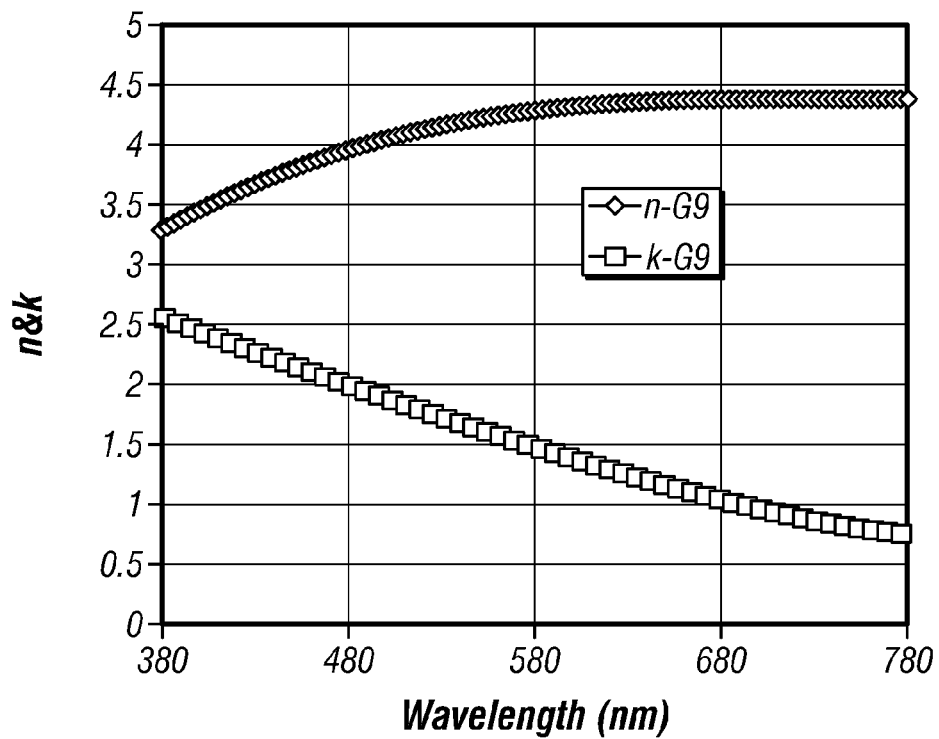
FIG. 14 is an experimental dispersion curve of a 90 Å Ge layer deposited on the substrate.

FIG. 14 is an experimental dispersion curve of a 90 Å Ge layer deposited by sputtering, which confirms that Ge is one of the materials having a refractive index (n) that increases and/or an extinction coefficient (k) that decreases as the wavelength increases within an operative optical range (i.e., 400 to 700 nm).

Figure 15:
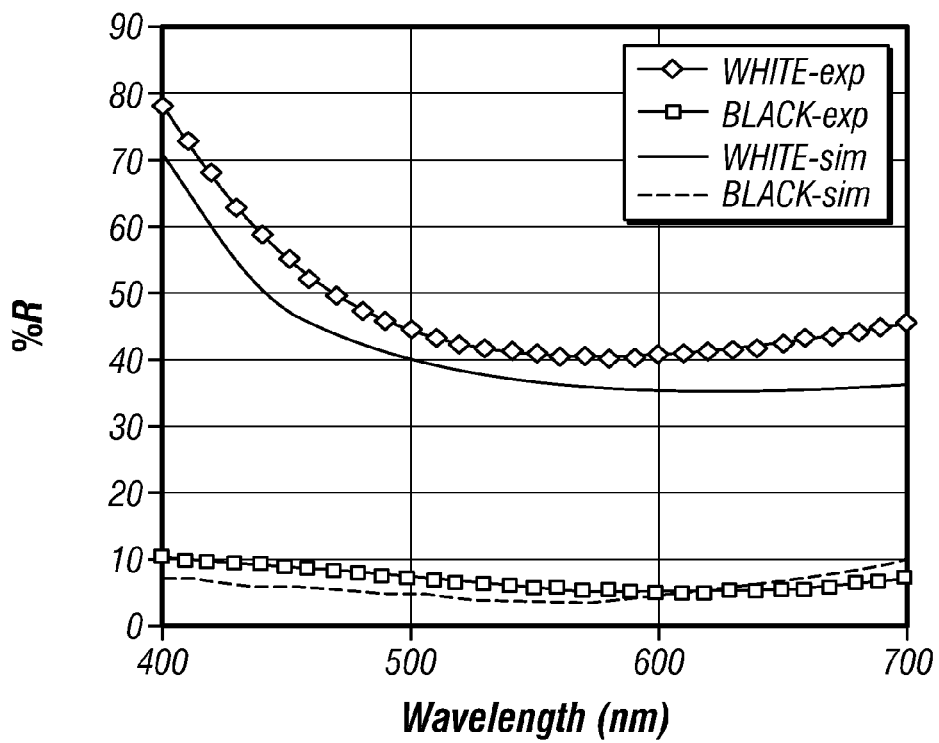
FIG. 15 is a comparison of experimental and simulated spectral responses of the unreleased interferometric modulator of FIG. 13.

FIG. 15 is the spectral responses of these unreleased interferometric modulators with 90 Å of Ge as the partially reflective layer. Both the simulated and experimental data displayed an overall reflectance in the range of 30 to 70% in the bright state (e.g., with a 1080 Å $SiO_2$ layer) and below 10% in the dark state (e.g., with a 450 Å $SiO_2$ layer) between 400 and 700 nm wavelengths.

Example 4

Figure 16:
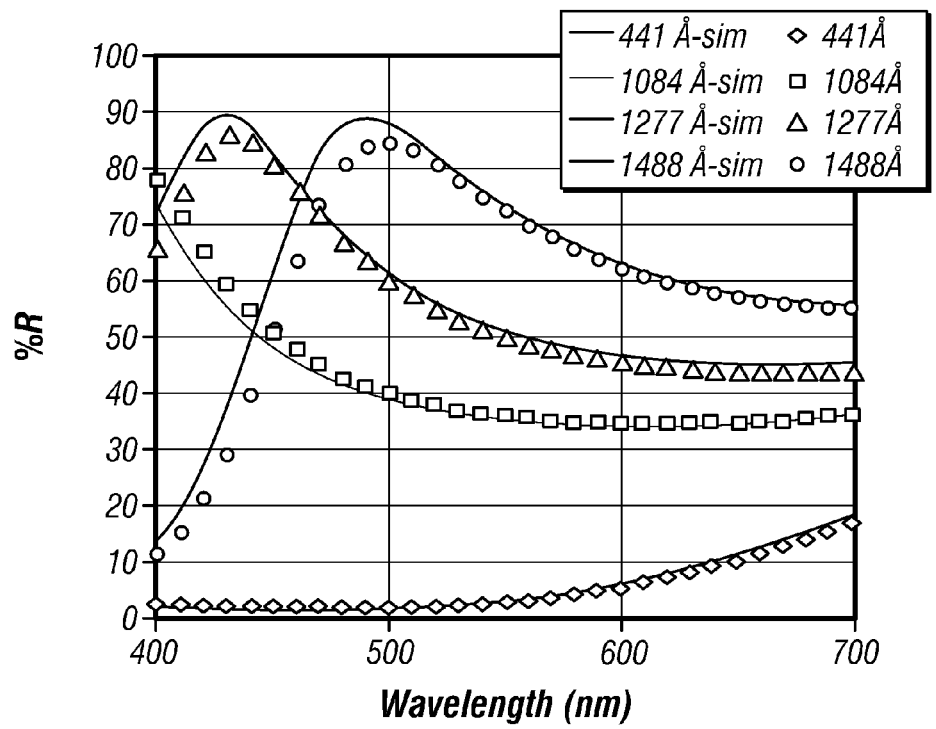
FIG. 16 is another comparison of experimental and simulated spectral responses of the unreleased interferometric modulator of FIG. 13.

A series of unreleased interferometric modulators as shown in FIG. 13 were made by depositing 70 Å of Ge as a partially reflective layer 23 on glass substrates. A $SiO_2$ insulating layer 101 was deposited on the Ge layer, and then an Al reflective layer 14 with a thickness of greater than 300 Å was deposited over the $SiO_2$ layer 101. A $SiO_2$ insulating layer 101 in an unreleased interferometric modulator represents the cavity in a released interferometric modulator. The thickness of the $SiO_2$ insulating layer 101 equals the distance of separation between the partially reflective layer 23 and the reflective layer 14 (i.e., the movable layer in a released interferometric modulator). Four different thicknesses of $SiO_2$ insulating layers 101 were used to construct four devices in this example. In one device, a 441 Å $SiO_2$ layer was deposited over the Ge layer to form a device that is equivalent to a released interferometric modulator in a dark state (FIG. 13B). Three other devices were made with $SiO_2$ of different thicknesses (FIG. 13A) for spectral response measurements in the bright state with different cavity sizes. The $SiO_2$ thicknesses for each of these devices were 1084 Å, 1277 Å and 1488 Å. FIG. 16 shows the spectral responses of these unreleased interferometric modulators with 70 Å of Ge as the partially reflective layer. Both the simulated and experimental data display an overall reflectance in the range of 30% to 70% at different bright states and below 20% for the dark state.

Example 5

Figure 11A:
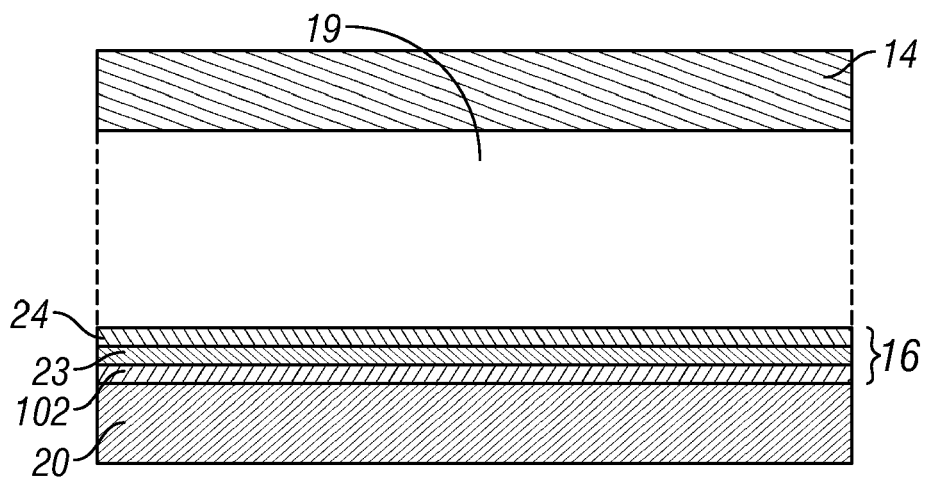
FIG. 11A is cross section of one embodiment of an interferometric modulator used for spectral response simulations in bright state.
Figure 11B:
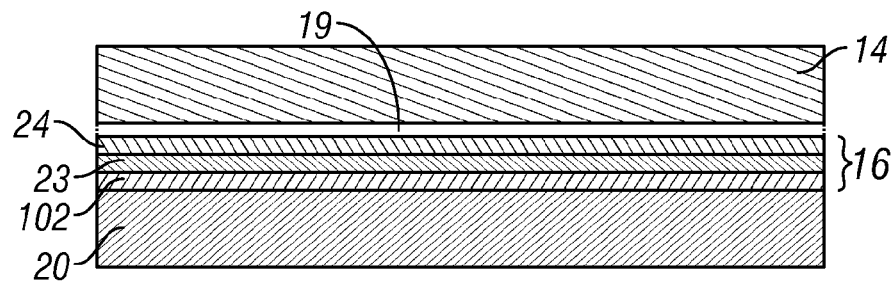
FIG. 11B is cross section of one embodiment of an interferometric modulator used for spectral response simulations in dark state.
Figure 12:
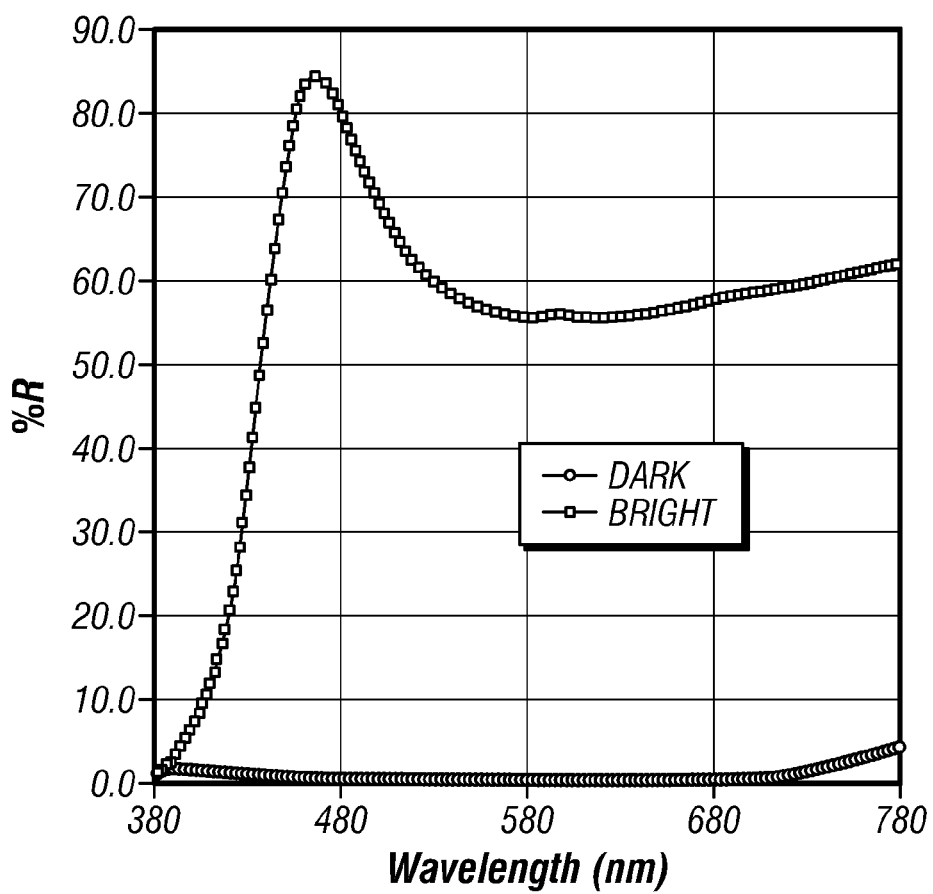
FIG. 12 is a simulated spectral response of a modeled interferometric modulator of FIG. 11 with Ge as absorber showing broadband white characteristic.

Another interferometric modulator device simulation was modeled based on one embodiment of the unreleased interferometric modulator shown in FIG. 11. The modeled structure included a glass substrate 20, an optical stack 16 on the glass substrate 20, a cavity 19 separating the optical stack 16 and an Al reflective layer 14. The optical stack 16 contains a partially reflective mater 23 layer over the ITO layer, and a dielectric layer over the partially reflective material 23. The input thicknesses of the layers in this simulation were 90 Å for the Ge layer, 250 Å of $SiO_2$ for the dielectric layers, and 300 Å for the Al layer. The cavity 19 has a 1700 Å separation in the bright state (FIG. 11A) and 100 Å in the dark state (FIG. 11B).

Figure 17:
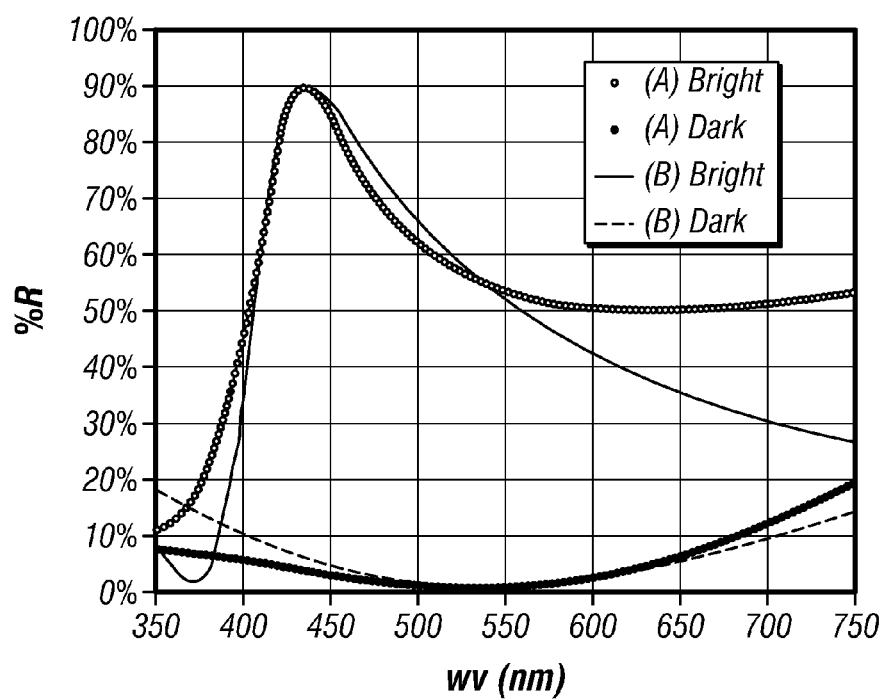
FIG. 17 shows the simulated spectral responses of two interferometric modulators: (A) is an interferometric modulator comprising Ge and (B) is an interferometric modulator comprising an absorber with n:k ratio of 4:1.6, which are average n and k values of Ge without dispersion.
Figure 18:
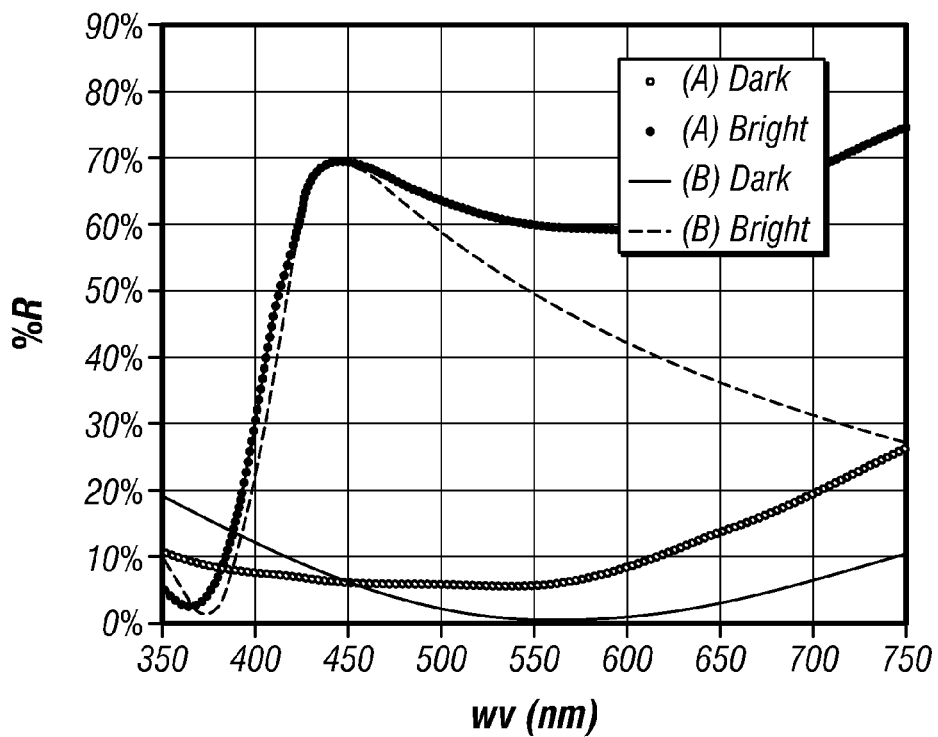
FIG. 18 shows the simulated spectral responses of (A) an interferometric modulator comprising CuO and (B) an interferometric modulator comprising an absorber with n:k ratio of 2.5:0.8, which are average n and k values of CuO without dispersion.
Figure 19:
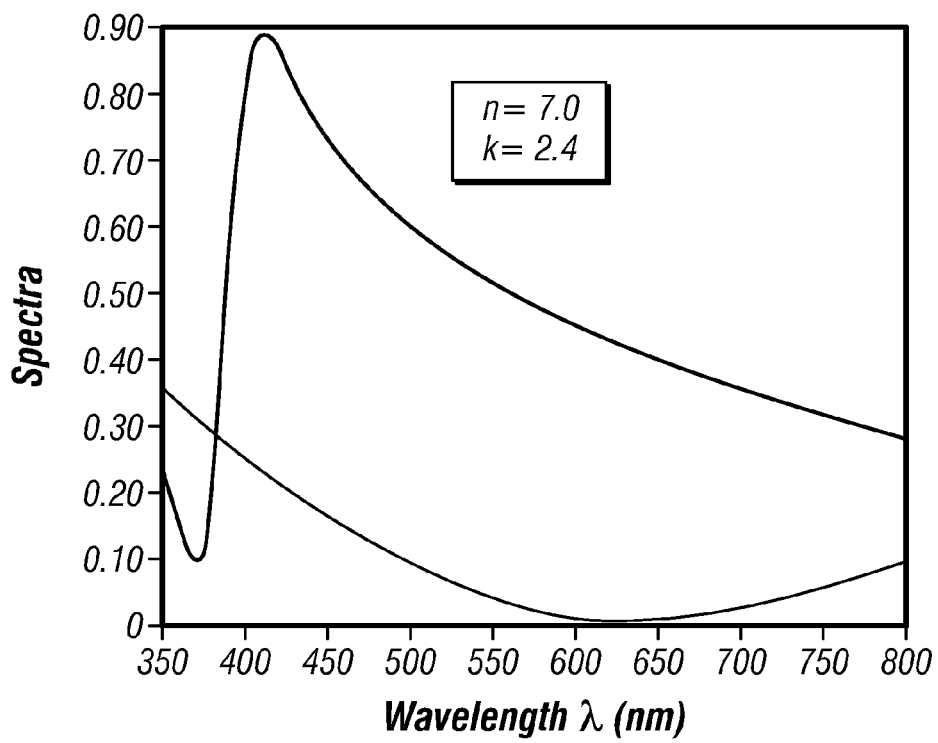
FIG. 19 shows the simulated spectral response of an interferometric modulator comprising a partially reflective material with n:k ratio of 7:2.4.
Figure 20:
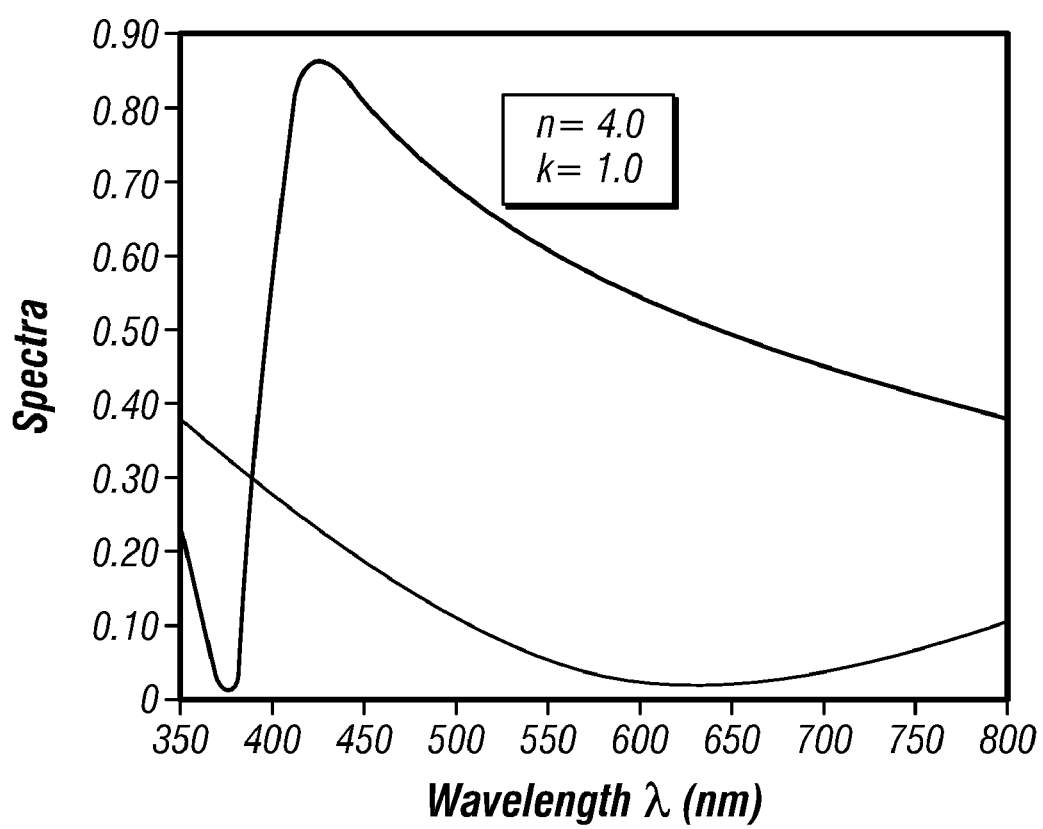
FIG. 20 shows the simulated spectral response of an interferometric modulator comprising a partially reflective material with n:k ratio of 4:1.

Partially reflective materials 23 (e.g., absorbers) of different n:k ratios were simulated to show the effects of tuning n and k parameters. FIG. 17 shows and compares the simulated spectral responses of two interferometric modulators: (A) is an interferometric modulator comprising Ge and (B) is an interferometric modulator comprising an absorber with n:k ratio of 4:1.6, which are average n and k values of Ge without dispersion. FIG. 18 shows the simulated spectral responses of (A) an interferometric modulator comprising CuO and (B) an interferometric modulator comprising an absorber with n:k ratio of 2.5:0.8, which are average n and k values of CuO without dispersion. Simulations using average n and k values of a certain partially reflective material are capable of predicting how the real material may respond within the operative optical range of the interferometric modulator. FIG. 19 shows the simulated spectral response of an interferometric modulator comprising a partially reflective material with n:k ratio of 7:2.4. FIG. 20 shows the simulated spectral response of an interferometric modulator comprising a partially reflective material with n:k ratio of 4:1. The results of these simulations suggest that the preferred n to k ratio is from about 2.5 to about 6, and more preferably about 3.

What is claimed is:

1. A method of making a display device, comprising:
providing a transparent substrate;
forming an absorber layer on the substrate; and
forming an array of interferometric modulators, wherein the interferometric modulators include a movable reflective layer over the absorber layer, the absorber layer having an extinction coefficient (k) below a threshold value for wavelengths of light within an operative optical range of the interferometric modulators, the absorber layer also having a refractive index (n) that increases as the wavelength of light increases within the operative optical range of the interferometric modulators.

2. The method of claim 1, wherein the threshold value is about 2.5.

3. The method of claim 1, wherein the extinction coefficient (k) remains substantially constant for wavelengths of light within the operative optical range of the interferometric modulators.

4. The method of claim 1, wherein the extinction coefficient (k) decreases as the wavelength of light increases within the operative optical range of the interferometric modulators.

5. The method of claim 1, wherein the absorber layer has an n to k ratio from about 2.5 to about 6.

6. The method of claim 1, wherein the absorber layer has an n to k ratio of about 3.

7. The method of claim 1, wherein forming the array of interferometric modulators comprises:
forming an optical stack on the transparent substrate;
depositing a sacrificial layer over the optical stack;
forming an electrically conductive layer over the sacrificial layer; and
removing at least a portion of the sacrificial layer to thereby form a cavity between the substrate and the electrically conductive layer.

8. The method of claim 7, wherein the optical stack further includes a transparent conductive material.

9. The method of claim 8, wherein the absorber layer is deposited over the transparent conductive material.

10. The method of claim 8, wherein the absorber layer is deposited under the transparent conductive material.

11. The method of claim 7, wherein the optical stack further includes a dielectric layer.

12. The method of claim 11, wherein the absorber layer is integrated within the dielectric layer.

13. The method of claim 7, wherein the sacrificial layer includes at least one of molybdenum, tungsten, amorphous silicon, and organic polymer.

14. The method of claim 7, further comprising depositing the absorber layer in contact with the transparent substrate.

15. The method of claim 1, further comprising integrating the absorber layer within the transparent substrate.

16. The method of claim 1, wherein the transparent substrate is glass or plastic.

17. The method of claim 1, wherein the absorber layer includes at least one of germanium, germanium alloy, doped germanium, and doped germanium-containing alloy.

18. The method of claim 17, wherein the absorber layer further includes a metal layer.

19. The method of claim 18, wherein the metal layer includes at least one of chromium, molybdenum, a refractive metal, and a refractive alloy.

20. The method of claim 1, wherein said operative optical range is from about 400 nm to about 700 nm.

21. A display device made by the method of claim 1.

22. A method of using a display device, comprising:
transmitting light through a substrate; and
interferometrically reflecting light with an interferometric modulator including an absorber over a portion of the substrate and a movable reflective layer over the absorber, wherein the absorber has an extinction coefficient (k) below a threshold value for wavelengths of light within an operative optical range of the interferometric modulator, and wherein the absorber has a refractive index (n) that increases as the wavelength of light increases within the operative optical range of the interferometric modulator.

23. The method of claim 22, wherein the threshold value is about 2.5.

24. The method of claim 22, wherein the extinction coefficient (k) remains substantially constant for wavelengths of light within the operative optical range of the interferometric modulator.

25. The method of claim 22, wherein the extinction coefficient (k) decreases as the wavelength of light increases within the operative optical range of the interferometric modulator.

26. The method of claim 22, wherein the absorber has an n to k ratio from about 2.5 to about 6.

27. The method of claim 22, wherein the absorber has an n to k ratio of about 3.

* * * * *

UNITED STATES PATENT AND TRADEMARK OFFICE
CERTIFICATE OF CORRECTION

| | | |
|---|---|---|
| PATENT NO. | : 8,077,379 B2 | Page 1 of 1 |
| APPLICATION NO. | : 12/634576 | |
| DATED | : December 13, 2011 | |
| INVENTOR(S) | : Gousev et al. | |

It is certified that error appears in the above-identified patent and that said Letters Patent is hereby corrected as shown below:

In column 18, line 38, in Claim 14, change "claim 7," to --claim 1,--.

Signed and Sealed this
Second Day of October, 2012

David J. Kappos
*Director of the United States Patent and Trademark Office*